(12) United States Patent
Brensinger et al.

(10) Patent No.: US 9,877,421 B2
(45) Date of Patent: Jan. 30, 2018

(54) SYSTEMS AND METHODS FOR TILLING GROUND MATERIALS

(71) Applicant: Green Heron Tools, LLC, New Tripoli, PA (US)

(72) Inventors: Elizabeth Brensinger, New Tripoli, PA (US); Ann Adams, New Tripoli, PA (US); Robert L. Wrye, Madera, PA (US); Aaron M. Yoder, Plattsmouth, NE (US); H. J. Sommer, State College, PA (US)

(73) Assignee: Green Heron Tools, LLC, New Tripoli, PA (US)

( * ) Notice: Subject to any disclaimer, the term of this patent is extended or adjusted under 35 U.S.C. 154(b) by 0 days.

(21) Appl. No.: 14/760,363

(22) PCT Filed: Feb. 26, 2014

(86) PCT No.: PCT/US2014/018658
§ 371 (c)(1),
(2) Date: Jul. 10, 2015

(87) PCT Pub. No.: WO2014/134160
PCT Pub. Date: Sep. 4, 2014

(65) Prior Publication Data
US 2015/0351308 A1 Dec. 10, 2015

Related U.S. Application Data

(60) Provisional application No. 61/769,389, filed on Feb. 26, 2013.

(51) Int. Cl.
*A01B 33/02* (2006.01)
*A01B 33/08* (2006.01)
*A01B 33/04* (2006.01)

(52) U.S. Cl.
CPC ............ *A01B 33/028* (2013.01); *A01B 33/04* (2013.01); *A01B 33/087* (2013.01)

(58) Field of Classification Search
CPC ..... A01B 33/02; A01B 33/022; A01B 33/028; A01B 33/04; A01B 33/06; A01B 33/065;
(Continued)

(56) References Cited

U.S. PATENT DOCUMENTS 98,017 A * 12/1869 Bondell ............... A01B 33/103
172/540
1,045,863 A * 12/1912 Lynch .................... A01B 9/003
172/119

(Continued)

FOREIGN PATENT DOCUMENTS

DE 828614 C 1/1952
FR 1071715 A 9/1954
(Continued)

OTHER PUBLICATIONS

European International Search Report and Written Opinion of the International Searching Authority, dated Oct. 10, 2014, for PCT/US14/018658.

*Primary Examiner* — Robert E Pezzuto
*Assistant Examiner* — Adam J Behrens
(74) *Attorney, Agent, or Firm* — Design IP

(57) ABSTRACT

Systems and methods for tilling ground material are provided. According to one embodiment, a tiller system is provided comprising two coiled conical blades that penetrate ground material to provide both forward propulsion and tillage of the ground material. An operator of the tiller system can adjust the angle at which the coiled conical blades penetrate the ground material to achieve an optimal balance of forward propulsion, stability, and tillage of the ground material.

16 Claims, 10 Drawing Sheets

(58) Field of Classification Search
CPC ..... A01B 33/087; A01B 33/10; A01B 33/103;
A01B 33/106; A01B 33/12; A01B
33/125; A01B 35/28; A01B 39/08; A01B
39/085; A01B 21/04; A01L 21/04; A01L
35/28; A01L 39/08; A01L 39/085
See application file for complete search history.

(56) References Cited

U.S. PATENT DOCUMENTS

| | | | | |
|---|---|---|---|---|
| 1,284,122 A * | 11/1918 | Maillet | A01B 33/028 | 172/114 |
| 2,051,443 A * | 8/1936 | Gravely | A01B 9/006 | 172/103 |
| 2,342,030 A * | 2/1944 | Bagan | A01B 33/103 | 172/119 |
| 2,375,137 A * | 5/1945 | Rutishauser | A01B 33/028 | 172/43 |
| 2,574,353 A * | 11/1951 | Singer | A01B 33/04 | 172/108 |
| 2,643,599 A * | 6/1953 | Wharton | A01B 33/04 | 172/116 |
| 2,792,770 A * | 5/1957 | Ober | A01B 33/06 | 172/111 |
| 2,808,771 A * | 10/1957 | Brown | A01B 29/046 | 172/349 |
| 2,876,850 A * | 3/1959 | Starrett | A01B 33/04 | 172/42 |
| 3,382,937 A * | 5/1968 | Watts | E21B 17/22 | 175/323 |
| 3,477,514 A * | 11/1969 | Woitas | A01B 33/028 | 172/119 |
| 3,605,995 A * | 9/1971 | Maack | B65G 33/00 | 198/660 |
| 3,658,135 A * | 4/1972 | Thompson | B62D 51/06 | 172/116 |
| 4,002,205 A * | 1/1977 | Falk | A01B 33/028 | 172/123 |
| 4,037,544 A * | 7/1977 | Cantone | A01B 33/082 | 111/122 |
| 4,121,668 A * | 10/1978 | Miner | A01B 33/04 | 172/42 |
| 4,272,258 A * | 6/1981 | Shifflett | E21B 21/067 | 55/348 |
| 4,295,531 A * | 10/1981 | Strickland | A01B 33/04 | 172/108 |
| 4,621,697 A * | 11/1986 | Webb | A01B 33/08 | 172/240 |
| 5,794,727 A * | 8/1998 | Murray | E21B 10/44 | 175/313 |
| 6,595,298 B1 * | 7/2003 | Crady | A01B 1/065 | 172/111 |
| 8,227,948 B1 * | 7/2012 | Fox | H02K 1/06 | 310/50 |
| 2003/0098166 A1 * | 5/2003 | Teeple | A01B 33/028 | 172/63 |
| 2004/0140108 A1 * | 7/2004 | Yamazaki | A01B 33/028 | 172/42 |

FOREIGN PATENT DOCUMENTS

FR 2322521 A1 * 4/1977 ........... A01B 33/028
GB 154437 A 12/1920

* cited by examiner

SYSTEMS AND METHODS FOR TILLING GROUND MATERIALS

CROSS REFERENCE TO RELATED APPLICATIONS

This application claims the benefit of U.S. Provisional Application No. 61/769,389, filed Feb. 26, 2013, which is hereby incorporated by reference as if fully set forth.

STATEMENT REGARDING FEDERALLY SPONSORED RESEARCH OR DEVELOPMENT

This invention was made with government support under Grant No. 2010-33610-21862, awarded by the National Institute of Food and Agriculture, USDA. The government has certain rights in the invention.

BACKGROUND OF THE INVENTION

Tillage devices are often utilized to cultivate ground material (e.g., soil) in preparation for the planting of crops. Examples of tillage devices range from plows that are dragged through soil to cultivators and harrows that utilize discs, chains, blades, tines, and/or spikes to penetrate and till soil.

Certain tillage devices are power driven to provide powered tillage and forward propulsion. One such tillage device is the walk-behind rotary tiller, which uses rotating tines to till the soil. Also known as rototillers, these devices—categorized as front-, rear- and mid-tine tillers—are often difficult to control due to lurching, jumping and hopping through soil. Rotary tillers can also expose operators to excessive vibration and are often very heavy and difficult to maneuver. These issues can affect the efficiency with which soil can be tilled and expose the operator to various risks for injury and disability. These risks can be especially acute for women, who have significantly less upper-body strength than men and are more vulnerable to adverse effects from exposure to full-body vibration. In part for these reasons, farming is the number-one occupation associated with musculoskeletal disabilities among women in the U.S. Among women farmers who responded to an online survey posted by the applicant, a redesigned walk-behind tiller was the top priority for redesign among all agricultural tools and equipment. In addition to these risks posed to the operators of rototillers, ample evidence exists that current rototiller technology often over-processes or pulverizes the soil, damaging soil structure and harming microscopic organisms essential for soil health. This can cause soil compaction, contribute to erosion, and/or harm soil fertility.

Accordingly, there is an unmet need for systems and methods for tilling ground material that overcome deficiencies of the prior art.

SUMMARY OF THE INVENTION

According to one embodiment of the present invention, disclosed is a system for tilling ground material comprising: a frame having a forward end and a rearward end; a rear wheel sub-assembly coupled to the frame, the rear wheel sub-assembly comprising at least one rear wheel, at least a portion of the at least one rear wheel being positionable below the frame; a front wheel sub-assembly coupled to the frame, the front wheel sub-assembly comprising at least one front wheel, the at least one front wheel being positioned forward with respect to the at least one rear wheel; a first coiled conical blade, the first coiled conical blade having a shaft having a longitudinal axis, at least a portion of the first coiled conical blade being positioned below the lowermost portion of the frame, at least a portion of the first coiled conical blade being positioned forward of the at least one rear wheel and rearward of the at least one front wheel; a second coiled conical blade, the second coiled conical blade having a shaft having a longitudinal axis, at least a portion of the second coiled conical blade being positioned below the lowermost portion of the frame, at least a portion of the second coiled conical blade being positioned forward of the at least one rear wheel and rearward of the at least one front wheel; a power sub-assembly coupled to the frame and the first and second coiled conical blades, the power sub-assembly comprising at least one motor operatively configured to rotate the first and second coiled conical blades about their respective longitudinal axes of their respective shafts; and a handle bar sub-assembly coupled to the frame, the handle bar sub-assembly comprising at least one member extending rearward of the at least one rear wheel.

According to another embodiment of the present invention, disclosed is a system for tilling ground material comprising: a frame having a forward end and a rearward end; a rear wheel sub-assembly coupled to the frame, the rear wheel sub-assembly comprising at least one rear wheel, at least a portion of the at least one rear wheel being positionable below the frame; a front wheel sub-assembly coupled to the frame, the front wheel sub-assembly comprising at least one front wheel, the at least one front wheel being positioned forward with respect to the at least one rear wheel; a first coiled conical blade, the first coiled conical blade having a shaft having a longitudinal axis and flighting helically coiled about the shaft, at least a portion of the first coiled conical blade being positioned below the lowermost portion of the frame, at least a portion of the first coiled conical blade being positioned forward of the at least one rear wheel and rearward of the at least one front wheel; a second coiled conical blade, the second coiled conical blade having a shaft having a longitudinal axis and flighting helically coiled about the shaft, at least a portion of the second coiled conical blade being positioned below the lowermost portion of the frame, at least a portion of the second coiled conical blade being positioned forward of the at least one rear wheel and rearward of the at least one front wheel, wherein the flighting helically coiled about the shaft of the second coiled conical blade is helically coiled in an opposite direction than a direction in which the flighting helically coiled about the shaft of the first coiled conical blade is helically coiled; a power sub-assembly coupled to the frame and the first and second coiled conical blades, the power sub-assembly comprising at least one motor operatively configured to rotate the first and second coiled conical blades about their respective longitudinal axes of their respective shafts; and a handle bar sub-assembly coupled to the frame, the handle bar sub-assembly comprising at least one member extending rearward of the at least one rear wheel.

According to another embodiment of the present invention, disclosed is a system for tilling ground material comprising: a frame having a forward end and a rearward end; a rear wheel sub-assembly coupled to the frame, the rear wheel sub-assembly comprising at least one coulter wheel, at least a portion of the at least one rear coulter wheel being positionable below the frame; a front wheel sub-assembly coupled to the frame, the front wheel sub-assembly comprising at least one front wheel, the at least one front wheel being positioned forward with respect to the at least one coulter wheel; a first coiled conical blade, the first coiled conical blade having a shaft having a longitudinal axis and flighting helically coiled about the shaft, at least a portion of the flighting of the first coiled conical blade being open, at least a portion of the first coiled conical blade being positioned below the lowermost portion of the frame, at least a portion of the first coiled conical blade being positioned forward of the at least one coulter wheel and rearward of the at least one front wheel; a second coiled conical blade, the second coiled conical blade having a shaft having a longitudinal axis and flighting helically coiled about the shaft, at least a portion of the second coiled conical blade being positioned below the lowermost portion of the frame, at least a portion of the flighting of the second coiled conical blade being open, at least a portion of the second coiled conical blade being positioned forward of the at least one coulter wheel and rearward of the at least one front wheel, wherein the flighting helically coiled about the shaft of the second coiled conical blade is helically coiled in an opposite direction than a direction in which the flighting helically coiled about the shaft of the first coiled conical blade is helically coiled; a power sub-assembly coupled to the frame and the first and second coiled conical blades, the power sub-assembly comprising at least one motor operatively configured to counter-rotate the first and second coiled conical blades about their respective longitudinal axes of their respective shafts; and a handle bar sub-assembly coupled to the frame, the handle bar sub-assembly comprising at least one member extending rearward of the at least one rear wheel.

The present disclosure provides additional aspects of the invention, as detailed below.

Aspect 1. A system for tilling ground material comprising:
a frame having a forward end and a rearward end;
a rear wheel sub-assembly coupled to the frame, the rear wheel sub-assembly comprising at least one rear wheel, at least a portion of the at least one rear wheel being positionable below the frame;
a front wheel sub-assembly coupled to the frame, the front wheel sub-assembly comprising at least one front wheel, the at least one front wheel being positioned forward with respect to the at least one rear wheel;
a first coiled conical blade, the first coiled conical blade having a shaft having a longitudinal axis, at least a portion of the first coiled conical blade being positioned below the lowermost portion of the frame, at least a portion of the first coiled conical blade being positioned forward of the at least one rear wheel and rearward of the at least one front wheel;
a second coiled conical blade, the second coiled conical blade having a shaft having a longitudinal axis, at least a portion of the second coiled conical blade being positioned below the lowermost portion of the frame, at least a portion of the second coiled conical blade being positioned forward of the at least one rear wheel and rearward of the at least one front wheel;
a power sub-assembly coupled to the frame and the first and second coiled conical blades, the power sub-assembly comprising at least one motor operatively configured to rotate the first and second coiled conical blades about their respective longitudinal axes of their respective shafts; and
a handle bar sub-assembly coupled to the frame, the handle bar sub-assembly comprising at least one member extending rearward of the at least one rear wheel.

Aspect 2. The system of Aspect 1, wherein the first and second coiled conical blades each comprise:
a shaft having a first and second opposed end, the first opposed end having a tip;
flighting helically coiled about the shaft, the helical coil of the flighting having a radius that increases from the first opposed end toward the second opposed end, wherein at least a portion of the flighting helically coiled about the shaft is closed.

Aspect 3. The system of Aspect 2, wherein at least a portion of the flighting helically coiled about the shaft is open.

Aspect 4. The system of Aspect 3, wherein the closed portion of the flighting is positioned toward the first opposed end and the open portion of the flighting is positioned toward the second opposed end.

Aspect 5. The system of Aspect 2, wherein the flighting helically coiled about the shaft is continuous along its length from the first opposed end toward the second opposed end.

Aspect 6. The system of Aspect 2, wherein the helical coil of the flighting has a radius that increases substantially linearly from the first opposed end toward the second opposed end, defining a conical shape.

Aspect 7. The system of any of Aspects 1 through 6, wherein the longitudinal axes of the shafts of the first and second coiled conical blades are co-planar with each other and are at a fixed angle relative to a longitudinal axis of the frame.

Aspect 8. The system of Aspect 7, wherein the longitudinal axes of the shafts of the first and second coiled conical blades are parallel with the longitudinal axis of the frame.

Aspect 9. The system of any of Aspects 1 through 8, wherein a distance of the at least one rear wheel relative to the frame is adjustable.

Aspect 10. The system of any of Aspects 1 through 9, wherein a distance of the at least one front wheel relative to the frame is adjustable.

Aspect 11. The system of any of Aspects 1 through 10, wherein the at least one rear wheel comprises at least two coulter wheels.

Aspect 12. The system of any of Aspects 1 through 11, wherein the power sub-assembly comprises:
a first electric motor operatively coupled to a power source and at least one first drive shaft, the at least one first drive shaft being operatively coupled to the first coiled conical blade; and
a second electric motor operatively coupled to a power source and at least one second drive shaft, the at least one second drive shaft being operatively coupled to the second coiled conical blade.

Aspect 13. A system for tilling ground material comprising:
a frame having a forward end and a rearward end;
a rear wheel sub-assembly coupled to the frame, the rear wheel sub-assembly comprising at least one rear wheel, at least a portion of the at least one rear wheel being positionable below the frame;
a front wheel sub-assembly coupled to the frame, the front wheel sub-assembly comprising at least one front wheel, the at least one front wheel being positioned forward with respect to the at least one rear wheel;
a first coiled conical blade, the first coiled conical blade having a shaft having a longitudinal axis and flighting helically coiled about the shaft, at least a portion of the first coiled conical blade being positioned below the lowermost portion of the frame, at least a portion of the first coiled conical blade being positioned forward of the at least one rear wheel and rearward of the at least one front wheel;
a second coiled conical blade, the second coiled conical blade having a shaft having a longitudinal axis and flighting helically coiled about the shaft, at least a portion of the second coiled conical blade being positioned below the lowermost portion of the frame, at least a portion of the second coiled conical blade being positioned forward of the at least one rear wheel and rearward of the at least one front wheel, wherein the flighting helically coiled about the shaft of the second coiled conical blade is helically coiled in an opposite direction than a direction in which the flighting helically coiled about the shaft of the first coiled conical blade is helically coiled;

a power sub-assembly coupled to the frame and the first and second coiled conical blades, the power sub-assembly comprising at least one motor operatively configured to rotate the first and second coiled conical blades about their respective longitudinal axes of their respective shafts; and a handle bar sub-assembly coupled to the frame, the handle bar sub-assembly comprising at least one member extending rearward of the at least one rear wheel.

Aspect 14. The system of Aspect 13, wherein the helical coil of the flighting of the first coiled conical blade has a radius that increases from one end of the shaft of the first coiled conical blade to another end of the shaft of the first coiled conical blade, and the helical coil of the flighting of the second coiled conical blade has a radius that increases from one end of the shaft of the second coiled conical blade to another end of the shaft of the second coiled conical blade, and at least a portion of the flighting of the first coiled conical blade and a portion of the flighting of the second coiled conical blade are closed.

Aspect 15. The system of Aspect 13 or 14, wherein at least a portion of the flighting of the first coiled conical blade and a portion of the flighting of the second coiled conical blade are open.

Aspect 16. The system of any of Aspects 13 through 15, wherein the flighting of the first coiled conical blade and the flighting of the second coiled conical blade are continuous along their respective lengths.

Aspect 17. A system for tilling ground material comprising:

a frame having a forward end and a rearward end;

a rear wheel sub-assembly coupled to the frame, the rear wheel sub-assembly comprising at least one coulter wheel, at least a portion of the at least one rear coulter wheel being positionable below the frame;

a front wheel sub-assembly coupled to the frame, the front wheel sub-assembly comprising at least one front wheel, the at least one front wheel being positioned forward with respect to the at least one coulter wheel;

a first coiled conical blade, the first coiled conical blade having a shaft having a longitudinal axis and flighting helically coiled about the shaft, at least a portion of the flighting of the first coiled conical blade being open, at least a portion of the first coiled conical blade being positioned below the lowermost portion of the frame, at least a portion of the first coiled conical blade being positioned forward of the at least one coulter wheel and rearward of the at least one front wheel;

a second coiled conical blade, the second coiled conical blade having a shaft having a longitudinal axis and flighting helically coiled about the shaft, at least a portion of the second coiled conical blade being positioned below the lowermost portion of the frame, at least a portion of the flighting of the second coiled conical blade being open, at least a portion of the second coiled conical blade being positioned forward of the at least one coulter wheel and rearward of the at least one front wheel, wherein the flighting helically coiled about the shaft of the second coiled conical blade is helically coiled in an opposite direction than a direction in which the flighting helically coiled about the shaft of the first coiled conical blade is helically coiled;

a power sub-assembly coupled to the frame and the first and second coiled conical blades, the power sub-assembly comprising at least one motor operatively configured to counter-rotate the first and second coiled conical blades about their respective longitudinal axes of their respective shafts; and a handle bar sub-assembly coupled to the frame, the handle bar sub-assembly comprising at least one member extending rearward of the at least one rear wheel.

Aspect 18. The system of Aspect 17, wherein a distance of the at least one coulter wheel relative to the frame is adjustable.

Aspect 19. The system of Aspect 17 or 18, wherein a distance of the at least one front wheel relative to the frame is adjustable.

Aspect 20. The system of any of Aspects 17 through 19, wherein the longitudinal axis of the shaft of the first coiled conical blade is co-planar and parallel with the longitudinal axis of the shaft of the second coil conical blade.

Aspect 21. A coiled conical blade for tilling ground material, comprising: a shaft and flighting helically coiled about the shaft, wherein the flighting has a radius that increases from one end of the shaft to another end of the shaft, at least a first portion of the flighting is closed and at least a second portion of the flighting is open.

Aspect 22. The coiled conical blade of Aspect 21, wherein the flighting is continuous along its length.

Aspect 23. The coiled conical blade of Aspect 21 or 22, wherein the at least a second portion of the flighting comprises at least one full twist of the flighting about the shaft.

Aspect 24. The coiled conical blade of any of Aspects 21 through 23, wherein the flighting has a beveled outer edge.

Aspect 25. The coiled conical blade of any of Aspects 21 through 24, further comprising a tip located at one end of the shaft, the tip comprising a plurality of beveled faces.

Aspect 26. The coiled conical blade of Aspect 25, wherein the plurality of beveled faces are separated from the flighting by a portion of the shaft about which the flighting is not helically coiled.

BRIEF DESCRIPTION OF THE DRAWINGS

The present invention will hereinafter be described in conjunction with the appended drawing figures wherein like numerals denote like elements.

DETAILED DESCRIPTION OF THE PREFERRED EMBODIMENTS

Figure 1A:
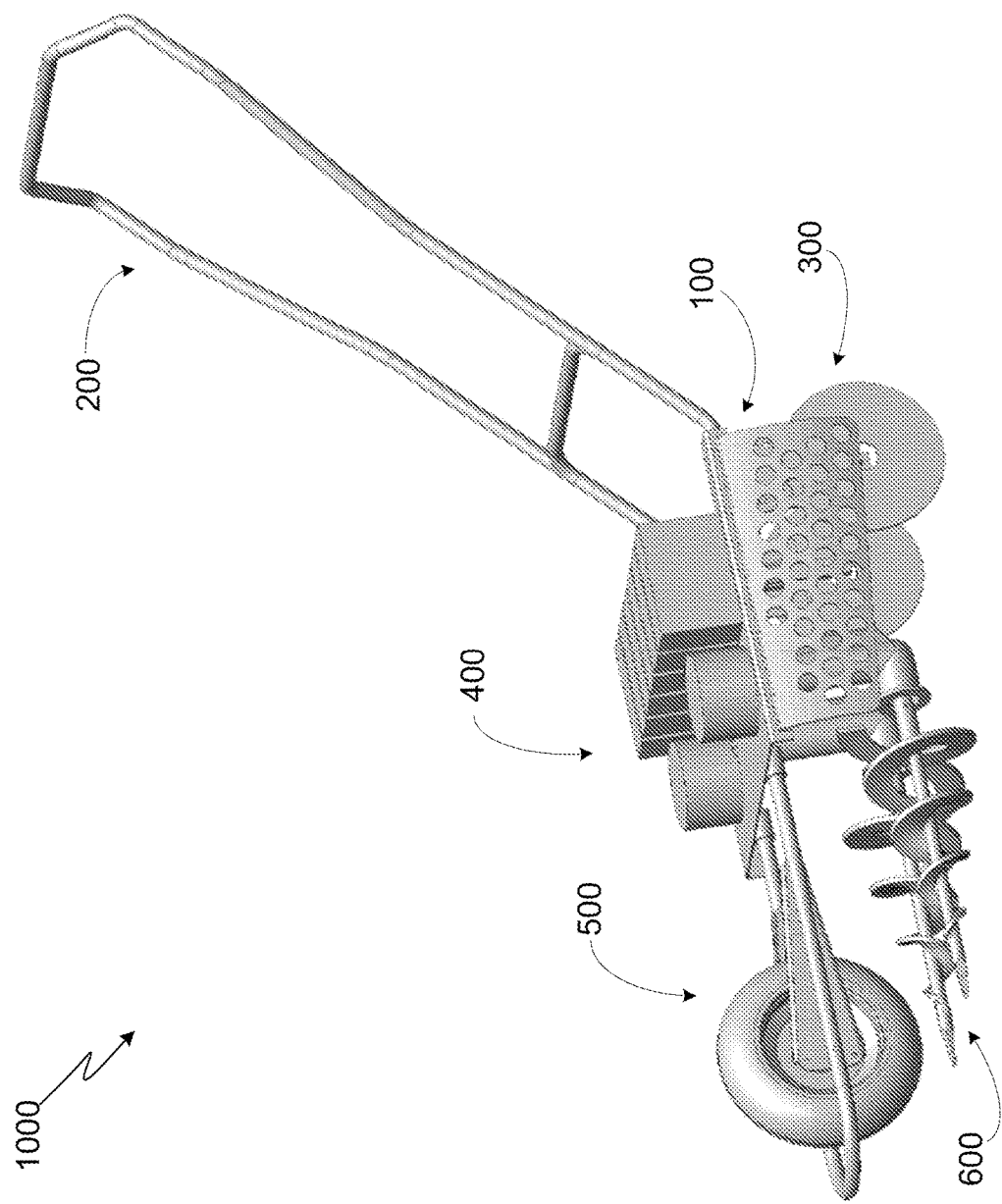
FIG. 1A shows a front-left axonometric view of a tiller system in accordance with a preferred exemplary embodiment of the present invention.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. It being understood that various changes may be made in the function and arrangement of elements without departing from the spirit and scope of the invention, as set forth in the appended claims.

To aid in describing the invention, directional terms are used in the specification and claims to describe portions of the present invention (e.g., forward, rearward, left, right, etc.). These directional definitions are merely intended to assist in describing and claiming the invention and are not intended to limit the invention in any way. In addition, reference numerals that are introduced in the specification in association with a drawing figure may be repeated in one or more subsequent figures without additional description in the specification in order to provide context for other features.

The term "ground material," as used in the specification and claims, refers broadly to any material to be tilled in accordance with embodiments of the invention. For example, ground material can include soil, plant material, small stones, and combinations thereof.

The term "tilling," as used in the specification and claims, refers to the action of agitating a top layer of ground material. For example, tilling can be used to prepare ground material for the planting of crops by aerating a top layer of soil and evenly distributing soil amendments such as compost or manure.

The term "coiled conical blade," as used in the specification and claims, refers collectively to a component of the present invention comprising a shaft and flighting (i.e., blade) helically coiled about the shaft.

The term "continuous," as used in the specification and claims with respect to flighting of a coiled conical blade, refers to flighting that is continuous and unbroken along its entire length as it coils about the shaft. Stated differently, a coiled conical blade having continuous flighting is one which includes only a single, unbroken flighting that is helically coiled about the shaft.

Figure 1B:
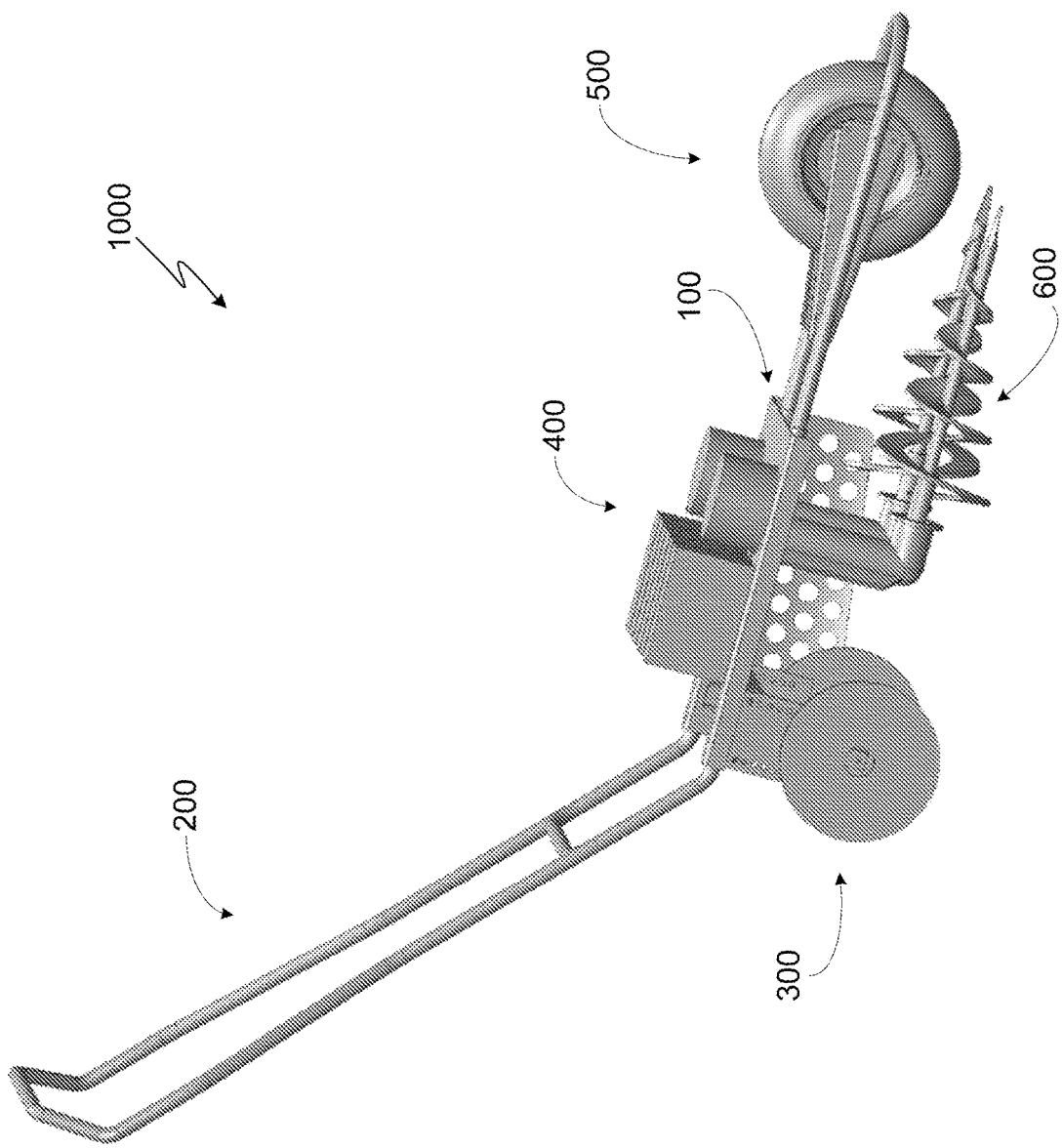
FIG. 1B shows a front-right axonometric view of the tiller system of FIG. 1A.
Figure 1C:
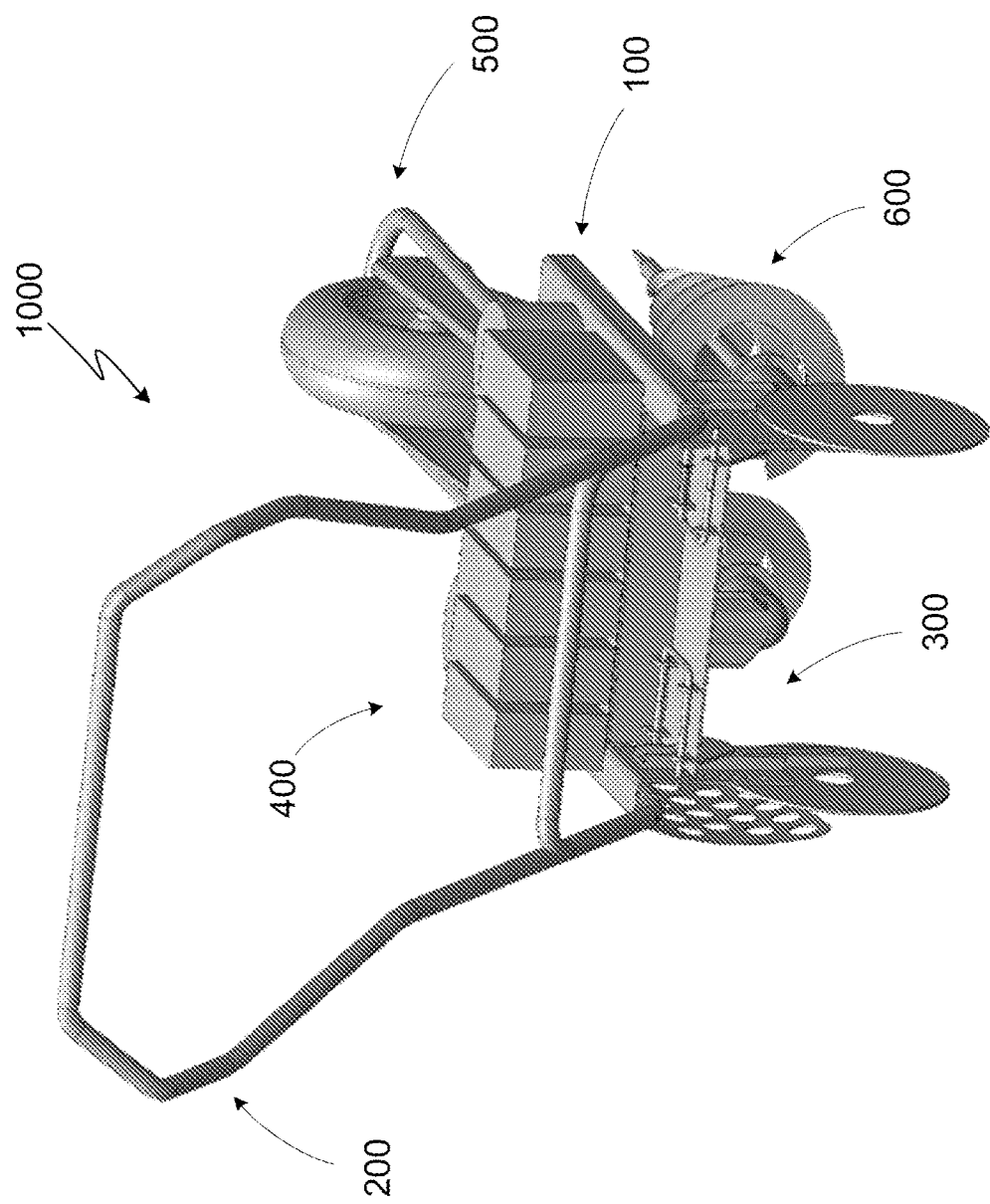
FIG. 1C shows a rear-right axonometric view of the tiller system of FIGS. 1A and 1B.

FIGS. 1A through 1C show axonometric views of a tiller system 1000 in accordance with a preferred exemplary embodiment of the present invention. In this exemplary embodiment, the tiller system 1000 comprises a chassis sub-assembly 100, a handlebar sub-assembly 200, a rear wheel sub-assembly 300, a power sub-assembly 400, a front wheel sub-assembly 500, and a coiled conical blade sub-assembly 600.

An operator of the tiller system 1000 walks behind the handlebar sub-assembly 200 and engages the power sub-assembly 400 and coiled conical blade sub-assembly 600. As discussed later in this specification, the coiled conical blade sub-assembly 600 includes a plurality of coiled conical blades comprising left and right coiled conical blades 602 and 617 that rotate and penetrate ground material to provide both forward propulsion and tillage of the ground material with enhanced stability and efficiency. The operator of the tiller system 1000 can also adjust the angle at which the left and right coiled conical blades 602 and 617 penetrate the ground material to achieve an optimal balance of forward propulsion, stability, and tillage of the ground material. In other embodiments, the plurality of coiled conical blades of the coiled conical blade sub-assembly 600 can comprise three or more coiled conical blades.

Figure 2:
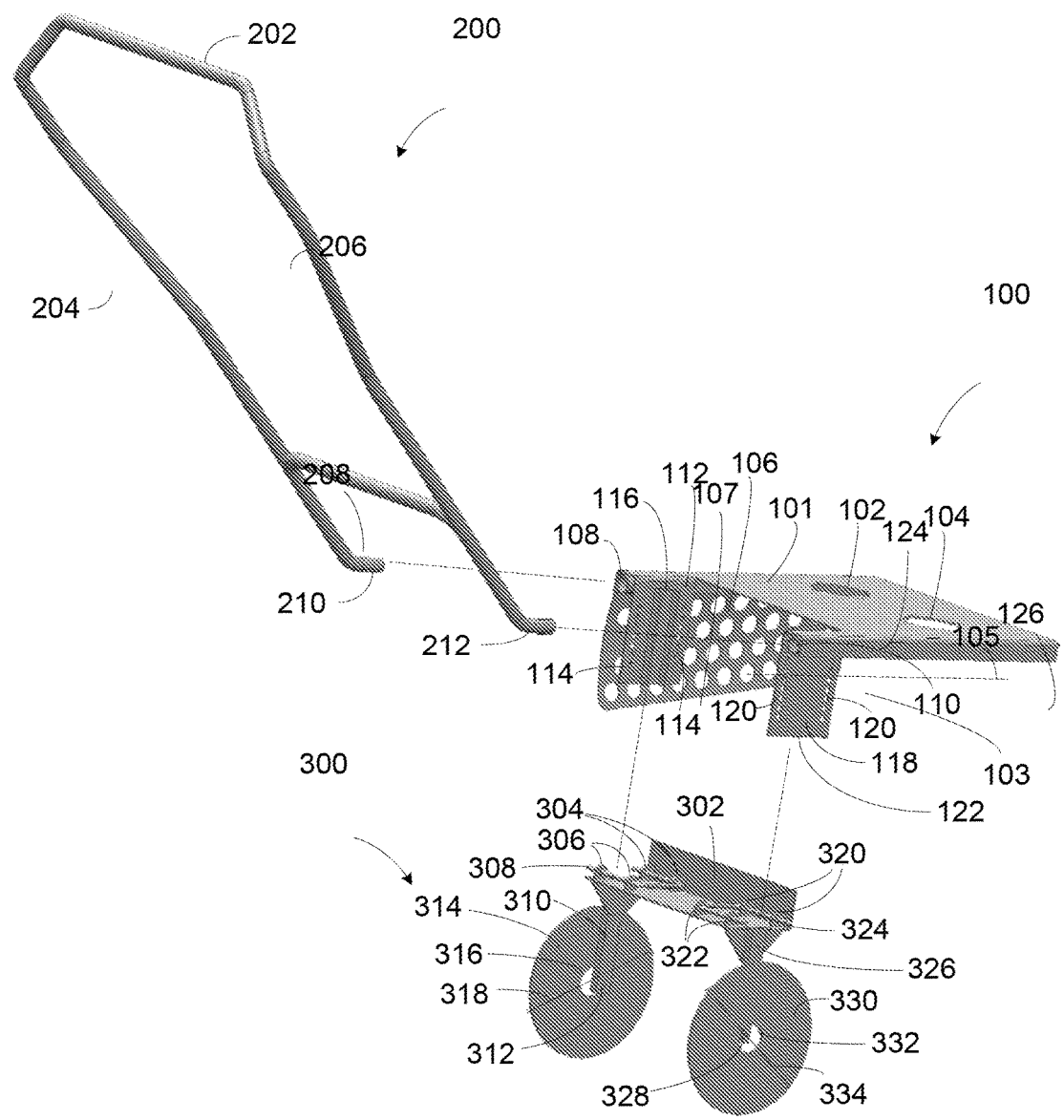
FIG. 2 shows a partial exploded view of a handlebar sub-assembly, a chassis sub-assembly, and a rear wheel sub-assembly of the tiller system of FIGS. 1A through 1C.

Turning now to FIG. 2, a partial exploded view of the chassis sub-assembly 100, the handlebar sub-assembly 200, and the rear wheel sub-assembly 300 is shown. The chassis sub-assembly 100 comprises a tiller frame 101 to which other components of the tiller system 1000 are coupled. In this exemplary embodiment, the tiller frame 101 is made of metal. In other embodiments, the tiller frame 101 can be made of other materials, such as plastics, carbon fiber composites, and combinations thereof. Similarly, the tiller frame 101 can have a variety of shapes other than those shown.

The tiller frame 101 includes a left motor mounting hole 102 and a right motor mounting hole 104 disposed in a top surface 103 through which motors can be mounted, as discussed later in this specification. The tiller frame 101 has a longitudinal axis 105 that extends along the top surface 103. A side skirt 106 is coupled (e.g., welded or bolted) to the left side of the tiller frame 101 and extends downward. While not shown for illustrative purposes, an additional side skirt 106 is coupled to the right side of the tiller frame 101 and extends downward. In this exemplary embodiment, the side skirts 106 are intended to protect an operator of the tiller system 1000 from potentially hazardous parts of the tiller system 1000, such as moving parts of the coiled conical blade sub-assembly 600. The side skirts 106 include a plurality of through holes 107 that, during operation of the tiller system 1000, enable tilled and displaced ground material to pass through the side skirts 106, thereby avoiding excessive buildup of tilled and displaced ground material beneath the tiller frame 101. The through holes 107 also allow air to flow underneath the tiller frame 101. In other embodiments, the side skirts 106 can be implemented as detachable accessories and/or omitted from the tiller system 1000.

A left cylindrical handlebar bracket 108 and a right cylindrical handlebar bracket 110 are coupled at the rearward-left and rearward-right corners of the tiller frame 101, respectively. The left and right cylindrical handle bar brackets 108 and 110 are adapted to receive the left cylindrical end 210 and right cylindrical end 212 of the left member 204 and right member 206 of the handlebar sub-assembly 200, respectively.

Figure 3:
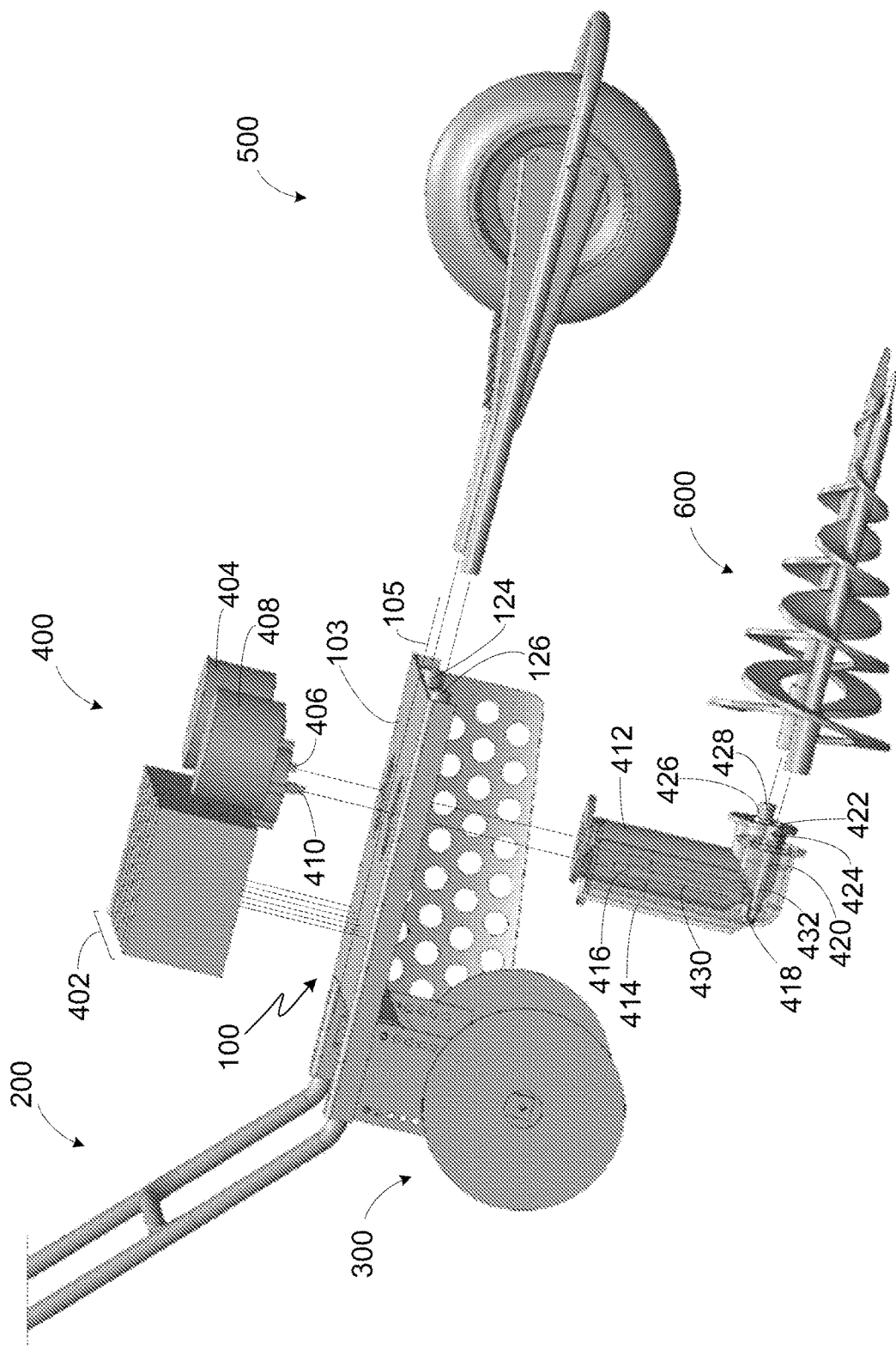
FIG. 3 shows a partial exploded view of a handlebar sub-assembly, a chassis sub-assembly, a rear wheel sub-assembly, a power sub-assembly, a front wheel sub-assembly, and a coiled conical blade sub-assembly of the tiller system of FIGS. 1A through 1C.

Similarly, a left cylindrical front wheel bracket 124 and a right cylindrical front wheel bracket 126 are coupled at the forward-left and forward-right corners of the tiller frame 101 (see also FIG. 3). The left and right cylindrical front wheel brackets 124 and 126 are adapted to receive the left cylindrical end 510 and the right cylindrical end 504 of the front wheel frame 502 of the front wheel sub-assembly 500, as discussed later in this specification.

A left rear wheel adjustment plate 112 is located at the rearward-left region of the tiller frame 101. In this exemplary embodiment, the left rear wheel adjustment plate 112 is formed of unitary construction with tiller frame 101, extending downward approximately perpendicular to the top surface 103 of the tiller frame 101 as shown.

The left rear wheel adjustment plate 112 includes a plurality of adjustment holes 114 that are arranged in two linear rows. A linear row of adjustment holes of the plurality of adjustment holes 114 is positioned parallel to and on each side of a guide rail slot 116. The guide rail slot 116 is adapted to receive a left guide rail 310 of the rear wheel sub-assembly 300 and the plurality of adjustment holes 114 are adapted to receive an adjustment pin 308 of the rear wheel sub-assembly 300, as discussed in greater detail later in this specification.

A right rear wheel adjustment plate 118 is located at the rearward-right region of the tiller frame 101. In this exemplary embodiment, the right rear wheel adjustment plate 118 is also formed of unitary construction with tiller frame 101, extending downward approximately perpendicular to the top surface 103 of the tiller frame 101 as shown.

Like the left rear wheel adjustment plate 112, the right rear wheel adjustment plate 118 includes a plurality of adjustment holes 120 that are arranged in two linear rows. A linear row of the adjustment holes 120 is positioned parallel to and on each side of a guide rail slot 122. The guide rail slot 122 is adapted to receive a right guide rail 326 of the rear wheel sub-assembly 300 and the plurality of adjustment holes 120 are adapted to receive an adjustment pin 324 of the rear wheel sub-assembly 300, as discussed in greater detail later in this specification.

The handlebar sub-assembly 200 comprises an upper handlebar cross member 202 having a left member 204 and right member 206 extending in a downward and forward direction relative to the upper handlebar cross member 202. A lower handlebar cross member 208 is coupled to the left member 204 and the right member 206. The left member 204 includes a left cylindrical end 210 and the right member 206 includes a right cylindrical end 212. The left cylindrical end 210 and right cylindrical end 212 are adapted to be inserted into the left cylindrical handlebar bracket 108 and right cylindrical handlebar bracket 110, respectively, to couple the handlebar sub-assembly 200 to the chassis sub-assembly 100. In other embodiments, the handlebar sub-assembly 200 can be coupled to the chassis sub-assembly 100 such that the handlebar sub-assembly 200 can be folded down toward the chassis sub-assembly 100 for transportation and storage.

For illustrative purposes, the handlebar sub-assembly 200 depicted does not include controls, wiring, or other components. It should be understood that, when practicing embodiments of the present invention, the handlebar sub-assembly 200 may include such components as necessary to operate the tiller system 1000. For example, the handlebar sub-assembly 200 may include one or more levers that are mounted on the upper handlebar cross member 202 and coupled to the power sub-assembly 400 such that, when an operator of the tiller system 1000 grips the one or more levers with his or her hands, the power sub-assembly 400 and the coiled conical blade sub-assembly 600 are engaged. Similarly, the handlebar sub-assembly 200 may include an on/off kill switch that is coupled to the power sub-assembly 400.

The rear wheel sub-assembly 300 comprises a plate 302 to which other components of the rear wheel sub-assembly 300 are coupled. When assembled, a portion of the plate 302 abuts a portion of the tiller frame 101 (see also FIGS. 1C and 3), but the plate 302 and the remainder of the rear wheel sub-assembly 300 can be moved relative to the remainder of the tiller system 1000, as discussed in greater detail below.

A first pair 304 and second pair 306 of adjustment pin brackets are coupled to the left side of the plate 302. Each adjustment pin bracket of the first pair 304 and second pair 306 has a through hole for receiving an adjustment pin 308. In this exemplary embodiment, the first pair 304 and second pair 306 of adjustment pin brackets are arranged such that the through hole of each adjustment bracket of each pair is aligned with the through hole of the other adjustment bracket of the pair, as shown.

When assembled, the adjustment pin 308 is inserted into the through holes of the first pair 304 and second pair 306 of adjustment pin brackets such that the ends of the adjustment pin 308 are in turn inserted into two adjustment holes of the plurality of adjustment holes 114 (see also FIG. 1C). In this embodiment, the adjustment pin 308 is formed of one piece having a "U" shape. In other embodiments, one or more adjustment pins having different shapes and constructions can be utilized.

A left guide rail 310 is coupled to the left side of the plate 302. The left guide rail 310 is adapted to slide into the guide rail slot 116 of the chassis sub-assembly 100. A through hole 312 in the left guide rail 310 is adapted to receive an axle bolt (not shown) of the left rear wheel 314.

In this exemplary embodiment, the left rear wheel 314 is a coulter wheel having a uniform thickness and a diameter 318. The left rear wheel 314 has a center opening 316 through which a hub and axle bolt (not shown) can pass for rotatably coupling the left rear wheel 314 to the left guide rail 310. In a preferred embodiment, the left rear wheel 314 uses a hub that includes bearings (not shown). The inventors have found that using coulter wheels for the left rear wheel 314 and right rear wheel 330 (discussed below) enhances the stability and performance of the tiller system 1000. Specifically, coulter wheels can penetrate the ground material and thereby resist lateral movement of the tiller system 1000 (i.e., movement that is perpendicular to the direction in which the tiller system 1000 is rolling), whereas traditional wheels that rest atop the ground material can slide laterally, contributing to hopping and skipping of the tiller system 1000. In other embodiments, a greater or lesser number of rear wheels can be utilized.

A first pair 320 and second pair 322 of adjustment pin brackets are also affixed to the right side of the plate 302. As previously discussed, each adjustment pin bracket of the first pair 320 and second pair 322 has a through hole for receiving an adjustment pin 324, and the first pair 320 and second pair 322 of adjustment pin brackets are arranged such that the through hole of each adjustment bracket of each pair is aligned with the through hole of the other adjustment bracket of the pair.

When assembled, the adjustment pin 324 is inserted into the through holes of the first pair 320 and second pair 322 of adjustment pin brackets such that the ends of the adjustment pin 324 are in turn inserted into two of the plurality of adjustment holes 120 (see also FIG. 1C). Here, the adjustment pin 324 is formed of one piece having a "U" shape. In other embodiments, one or more adjustment pins having different shapes and constructions can be utilized.

A right guide rail 326 is coupled to the right side of the plate 302. The right guide rail 326 is adapted to slide into the guide rail slot 122 of the chassis sub-assembly 100. A through hole 328 in the right guide rail 326 is adapted to receive an axle bolt (not shown) of the right rear wheel 330.

In this exemplary embodiment, as previously discussed, the right rear wheel 330 is a coulter wheel having a uniform thickness and a diameter 334 equal to the diameter 318 of the left rear wheel 314. The right rear wheel 330 has a center opening 332 through which a hub and axle bolt (not shown) can pass for rotatably coupling the right rear wheel 330 to the right guide rail 326. In a preferred embodiment, the right rear wheel 330 uses a hub that includes bearings (not shown).

When the rear wheel sub-assembly 300 is assembled with the chassis sub-assembly 100, the left guide rail 310 and the right guide rail 326 slide into the guide rail slot 116 and the guide rail slot 122, respectively. The adjustment pins 308 and 324 are inserted into respective adjustment holes of the plurality of adjustment holes 114 and 120 to secure the rear wheel sub-assembly 300 at a fixed distance from the chassis sub-assembly 100 (see also FIGS. 1C and 3).

The rear wheel sub-assembly 300 can then be raised and lowered relative to the chassis sub-assembly 100 by withdrawing the adjustment pins 308 and 324 from the respective adjustment holes of the plurality of adjustment holes 114 and 120, sliding the left and right guide rails 310 and 326 upward or downward within the respective guide rail slots 116 and 122, and reinserting the adjustment pins 308 and 324 into different adjustment holes of the plurality of 114 and 120. Accordingly, in this manner, an operator of the tiller system 1000 can adjust the height of the left and right rear wheels 314 and 330 relative to the chassis sub-assembly 100. In other embodiments, other mechanisms and structures can be used for raising and lowering the left and right rear wheels 314 and 330. For example, the left and right rear wheels 314 and 330 can each be coupled to a cylindrical tube that slides within a cylindrical collar mounted on the chassis sub-assembly 100 and is secured at different heights therein using pins, bolts, set screws, or other connection means.

Turning now to FIG. 3, a partial exploded view of the chassis sub-assembly 100, handlebar sub-assembly 200 (partially cropped), rear wheel sub-assembly 300, power sub-assembly 400, front wheel sub-assembly 500, and coiled conical blade sub-assembly 600 is shown.

Power sub-assembly 400 provides power to the tiller system 1000 and drives the coiled conical blade sub-assembly 600 and the front wheel 528. A power source 402 is mounted to tiller frame 101 along with a left motor 404 and a right motor 408. The left motor 404 is mounted to the tiller frame 101 such that the spindle 406 extends through the left motor mounting hole 102. Similarly, the right motor 408 is mounted to the tiller frame 101 such that the spindle 410 extends through the right motor mounting hole 104. In this exemplary embodiment, the power source 402 comprises batteries coupled to the left and right motors 404 and 408, which are electrical motors, to supply power and rotate the respective spindles 406 and 410. For example, power source 402 can be implemented with a removable 12 amp-hour battery electrically coupled to the left motor 404, and another removable 12 amp-hour battery electrically coupled to the right motor 408. The power source 402 can further include equipment for harnessing solar power (e.g., batteries coupled to one or more photovoltaic cells for solar recharging).

While this embodiment utilizes a plurality of batteries for the power source 402 and electrical motors for the left and right motors 404 and 408, the power sub-assembly 400 can comprise other components to provide power and drive the coiled conical blade sub-assembly 600. For example, the power source 402 can comprise one or more batteries which power a single electrical motor that drives all of the coiled conical blades of the coiled conical blade sub-assembly 600. Similarly, different types of motors can be used. For example, the power source 402 and the left and right motors 404 and 408 can be replaced with one or more internal combustion engines, which serve as a combined power source and motor.

The power sub-assembly 400 also includes a left shaft assembly housing 412 and a right shaft assembly housing 414, which are coupled to the tiller frame opposite the left and right motors 404 and 408, respectively. The left and right shaft assembly housings 412 and 414 are shaped into approximately right angles, as shown. Various controls (not shown) for the power sub-assembly 400 and other sub-systems can be mounted on the chassis sub-assembly 100 and/or the handlebar sub-assembly 200.

In FIG. 3, the right shaft assembly housing 414 is transparent so as to show components contained therein. A first drive shaft 416 having two ends is positioned within the right shaft assembly housing 414, substantially perpendicular to the longitudinal axis 105 extending through the top surface 103 of the tiller frame 101. One end of the first drive shaft 416 is coupled to the spindle 410 of the right motor 408. In other embodiments, the spindle 410 can be elongated so as to extend into the right shaft assembly housing 414, thereby serving as the first drive shaft 416.

A second drive shaft 420 is positioned within the right shaft assembly housing 414, substantially parallel to the longitudinal axis 105 extending through the top surface 103 of the tiller frame 101. One end of the second drive shaft 420 is coupled to the other end of the first drive shaft 416 via a gear arrangement 418, while the other end 422 of the second drive shaft 420 extends out of the right shaft assembly housing 414 and has a through hole 424. Preferably, the gear arrangement 418 couples the first drive shaft 416 and second drive shaft 420 relative to each other at an angle within a range of eighty-five to ninety-five degrees; more preferably, the angle is ninety degrees. The gear arrangement 418 can be implemented, for example, with a worm drive or other suitable gear arrangement.

While not shown in FIG. 3 for illustrative purposes, the left shaft assembly housing 412 includes the same components in the same configuration as those discussed with respect to the right shaft assembly housing 414: a first drive shaft (not shown) of the left shaft assembly housing 412 is coupled to the spindle 406 of the left motor 404; one end of the first drive shaft is coupled to a shaft coupler (not shown); one end of a second drive shaft (not shown) is also coupled to the shaft coupler, where the first drive shaft and second drive shaft are coupled by the shaft coupler at an angle that is approximately the same as the angle at which the gear arrangement 418 couples the first drive shaft 416 and second drive shaft 420 of the right shaft assembly housing 414; an end 426 of the second drive shaft extends out of the left shaft assembly housing 412, and has a through hole 428. Similarly, as will be apparent to those of ordinary skill in the art, the power sub-assembly 400 can include additional shaft assembly housings and/or other components as necessary to accommodate a coiled conical blade sub-assembly 600 that includes more than two coiled conical blades.

When assembled, the power sub-assembly 400 is coupled to the coiled conical blade sub-assembly 600 by inserting the end 422 of the second drive shaft 420 and the end 426 of the second drive shaft (not shown) of the left shaft assembly housing 412 into respective collars 623 and 609 of the left and right coiled conical blades 602 and 617 (see also FIGS. 5 and 6) and secured via a pin (not shown) inserted through the through holes 424 and 624, and a pin (not shown)

inserted through the through holes 428 and 610. In a preferred embodiment, the longitudinal axes 611 and 625 of the left and right coiled conical blades 602 and 617 are parallel to the longitudinal axis 105 of the tiller frame 101 (see, e.g., FIGS. 3, 5, and 8), as discussed in greater detail below.

Accordingly, in this exemplary embodiment, power supplied from the power source 402 powers the left and right motors 404 and 408, which rotate the respective spindles 406 and 410, which in turn rotate, respectively, the first drive shaft 416 and the first drive shaft (not shown) of the left shaft assembly housing 412 about a longitudinal axis 430 that is substantially perpendicular to the longitudinal axis 105 extending through the top surface 103 of the tiller frame 101. The gear arrangement 418 and the gear arrangement (not shown) of the left shaft assembly housing 412 translate the rotational motion of the of the first drive shaft 416 and the first drive shaft (not shown) of the left shaft assembly housing 412 into rotational motion of the second drive shaft 420 and the second drive shaft (not shown) of the left shaft assembly housing 412 about a longitudinal axis 432 that is substantially parallel to the longitudinal axis 105 extending through the top surface 103 of the tiller frame 101, thereby causing the ends 422 and 426 to rotate. The left and right coiled conical blades 602 and 617 that are coupled to the respective ends 426 and 422 counter-rotate with respect to each other, thereby providing the tiller system 1000 with both forward propulsion relative to ground material penetrated by the left and right coiled conical blades 602 and 617, and tillage of the ground material. In a preferred embodiment, the power sub-assembly 400 can rotate the left and right coiled conical blades 602 and 617 at a plurality of selectable speeds and can also reverse the rotation of the left and right coiled conical blades 602 and 617.

Figure 4A:
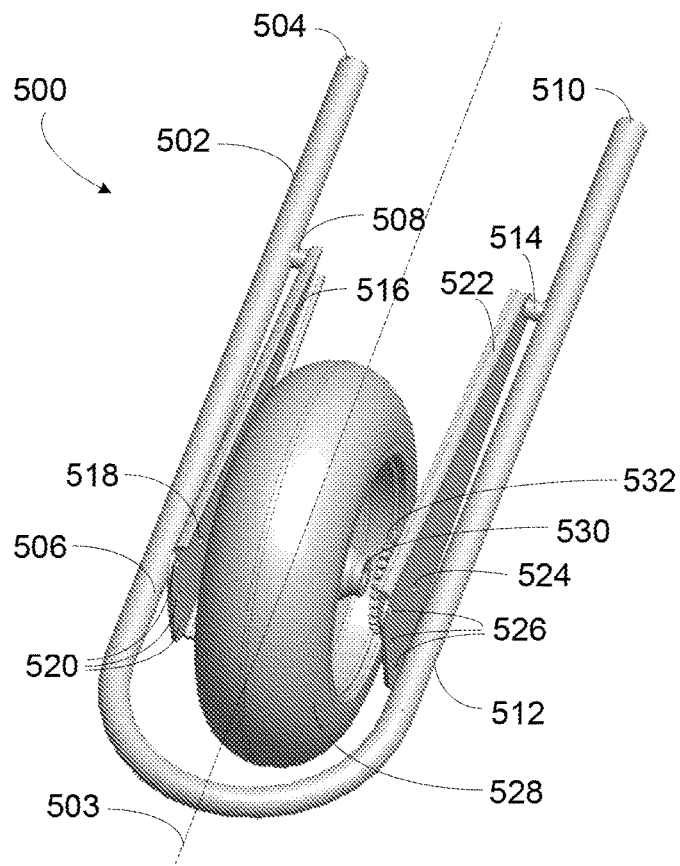
FIG. 4A shows a front-left axonometric view of the front wheel sub-assembly of FIGS. 1A through 1C.
Figure 4B:
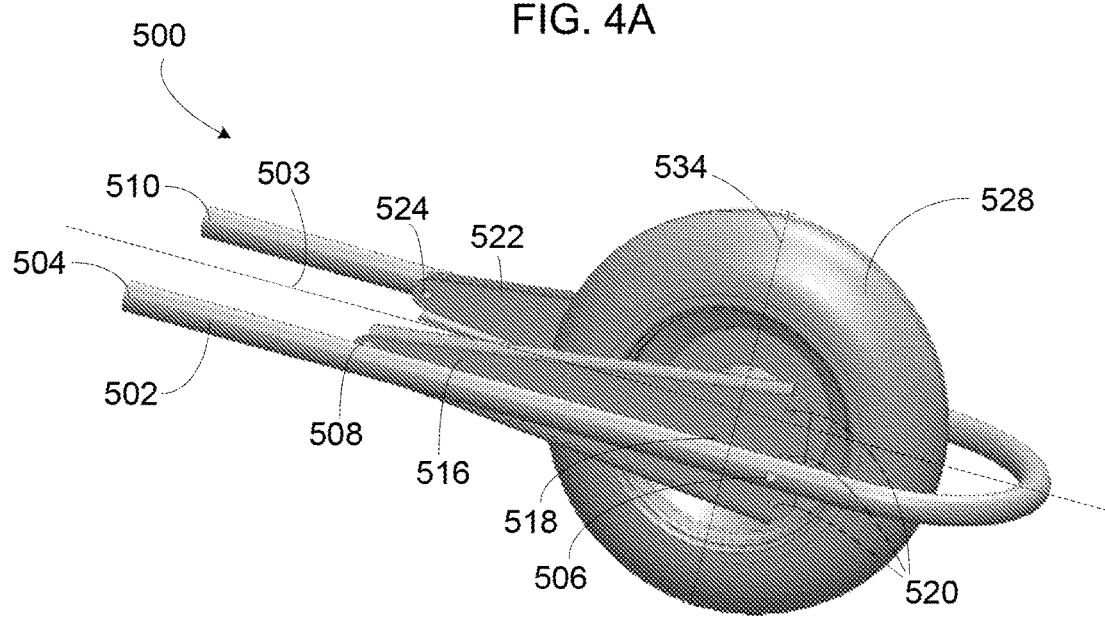
FIG. 4B shows a front-right axonometric view of the front wheel sub-assembly of FIGS. 1A through 1C.

Turning now to FIGS. 4A and 4B, shown are axonometric views of the front wheel sub-assembly 500. The front wheel sub-assembly 500 comprises a front wheel frame 502 to which other components of the front wheel sub-assembly 500 are coupled. In this exemplary embodiment, the front wheel frame 502 has a longitudinal axis 503 and a planar, "U" shape. In other embodiments, the front wheel frame 502 can have other shapes and constructions. Preferably, the front wheel frame 502 has a shape and construction that permits an operator of the tiller system 1000 to at least partially view the left and right conical blades 602 and 617 as they penetrate the ground material.

The front wheel sub-assembly 500 is coupled to the chassis sub-assembly 100 by inserting the right cylindrical end 504 and left cylindrical end 510 of front wheel frame 502 into the right cylindrical front wheel bracket 126 and left cylindrical front wheel bracket 124, respectively (see also FIG. 3).

A right through hole 506 in the front wheel frame 502 is adapted to receive an adjustment pin (not shown) for adjusting the height of the front wheel 528 relative to the front wheel frame 502, as discussed in greater detail below.

A right swing arm mount bracket 508 extends from the front wheel frame 502. A right swing arm 516 is pivotally coupled to the right swing arm mount bracket 508 via a fastener (e.g., a pin or bolt) (not shown) that enables pivoted movement of the right swing arm 516 at that point when adjusting the height of the front wheel 528 relative to the front wheel frame 502 (see also FIG. 8).

A left through hole 512 in the front wheel frame 502, like the right through hole 506, is adapted to receive an adjustment pin (not shown) for adjusting the height of the front wheel 528 relative to the front wheel frame 502.

A left swing arm mount bracket 514 extends from the front wheel frame 502, and a left swing arm 522 is pivotally coupled to the left swing arm mount bracket 514 via a fastener (not shown) that enables pivoted movement of the left swing arm 522 at that point when adjusting the height of the front wheel 528 relative to the front wheel frame 502, as previously discussed.

The right swing arm 516 is pivotally coupled to the right swing arm mount bracket 508. A through hole 518 in the right swing arm 516 is adapted to receive an axle (not shown) disposed through a front wheel hub 530 in order to rotatably couple the front wheel hub 530 and front wheel 528 to the right swing arm 516.

A plurality of adjustment through holes 520 is disposed in the right swing arm 516 in a linear manner. An adjustment pin (not shown) is inserted through the right through hole 506 in the front wheel frame 502 and one of the plurality of adjustment through holes 520, thereby securing the right swing arm 516 in a fixed position relative to the front wheel frame 502.

Similarly, the left swing arm 522 is pivotally coupled to the left swing arm mount bracket 514. A through hole 524 in the left swing arm 522 is adapted to receive the other end of the axle (not shown) disposed through the front wheel hub 530 in order to rotatably couple the front wheel hub 530 and front wheel 528 to the left swing arm 522.

A plurality of adjustment through holes 526 is disposed in the left swing arm 522 in a linear manner. An adjustment pin (not shown) is inserted through the left through hole 512 in front wheel frame 502 and one of the plurality of adjustment through holes 526, thereby securing the left swing arm 522 in a fixed position relative to the front wheel frame 502.

The front wheel 528 is disposed between the right swing arm 516 and the left swing arm 522. The front wheel hub 530 is adapted to receive the axle (not shown) that is disposed through the right and left through holes 518 and 524 for rotatably coupling the front wheel hub 530 and front wheel 528 to the right swing arm 516 and the left swing arm 522. The front wheel 528 has a diameter 534.

In this exemplary embodiment, the front wheel 528 is a solid wheel composed of rubber, plastic, and/or combinations thereof. In other embodiments, one or more front wheels of varying sizes and types can be utilized, such as tubeless rubber wheels and wheels having inner tubes. The inventors have found that utilizing the front wheel 528 provides additional stability to the tiller system 1000 and can enhance its performance. Specifically, the front wheel 528 rests atop the ground material with minimal penetration, thereby permitting the tiller system 1000 to efficiently roll in a forward direction while also preventing the coiled conical blades of the coiled conical blade sub-assembly 600 (discussed later in this specification) from penetrating too deeply into the ground material and becoming stuck or otherwise impeding forward propulsion. In other embodiments, two or more front wheels can be utilized.

In this exemplary embodiment, a chain ring 532 is positioned between the left swing arm 522 and the front wheel frame 502, and is secured on the axle (not shown) that is disposed through the left through hole 524 and the front wheel hub 530. The chain ring 532 is coupled via a chain (not shown) to the power sub-assembly 400, which rotates the front wheel 528 to provide forward propulsion. In another embodiment, the front wheel 528 is powered by a hub-mounted electric motor that includes just an electrical connection to the power sub-assembly 400. In a preferred embodiment, the front wheel hub 530 is capable of coasting, such that the power sub-assembly 400 need not always drive the front wheel 528. For example, an operator of the tiller system 1000 may wish to disengage the forward propulsion provided by the front wheel 528 and coast when moving downhill. In other embodiments, front wheel 528 can be completely passive (i.e., not coupled to the power sub-assembly 400). In a preferred embodiment, an operator can independently engage and disengage power to the coiled conical blade sub-assembly 600 and the front wheel 528. This feature enables an operator to operate the coiled conical blade sub-assembly 600 with or without forward propulsion provided by the front wheel 528, and to utilize the forward propulsion provided by the front wheel 528 without necessarily operating the coiled conical blade sub-assembly 600.

Accordingly, when the front wheel sub-assembly 500 is assembled with the chassis sub-assembly 100, an adjustment pin (not shown) is inserted through the right through hole 506 in the front wheel frame 502 and one of the plurality of adjustment through holes 520, and another adjustment pin (not shown) is inserted through the left through hole 512 and one of the plurality of adjustment through holes 526, thereby the front wheel 528 in at a fixed height relative to the front wheel frame 502.

At a later time, the front wheel 528 can then be raised or lowered relative to the front wheel frame 502 by withdrawing the adjustment pins from their respective adjustment through holes of the plurality of adjustment through holes 520 and 526, pivoting the right and left swing arms 516 and 522 about the points at which they are coupled to their respective swing arm mounting brackets 508 and 514, and reinserting the adjustment pins into different adjustment holes of the plurality of adjustment through holes 520 and 526. In this manner, an operator of the tiller system 1000 can adjust the height of the front wheel 528 relative to the front wheel frame 502 and the chassis sub-assembly 100. In other embodiments, other mechanisms and structures for raising and lowering the front wheel 528 can be used. For example, the front wheel frame 502 can be implemented in two portions that are hinged together, where the front wheel 528 and a first portion of the front wheel frame 502 are raised and lowered relative to the second portion of the front wheel frame 502 and the chassis sub-assembly 100 by pivoting upon the hinges. Similarly, different mechanisms can be used to secure the front wheel 528 at different positions relative to the chassis sub-assembly 100, such as, for example, an adjustment bolt that slides within a slot and is tightened to secure the bolt at a particular location along the slot.

Figure 5:
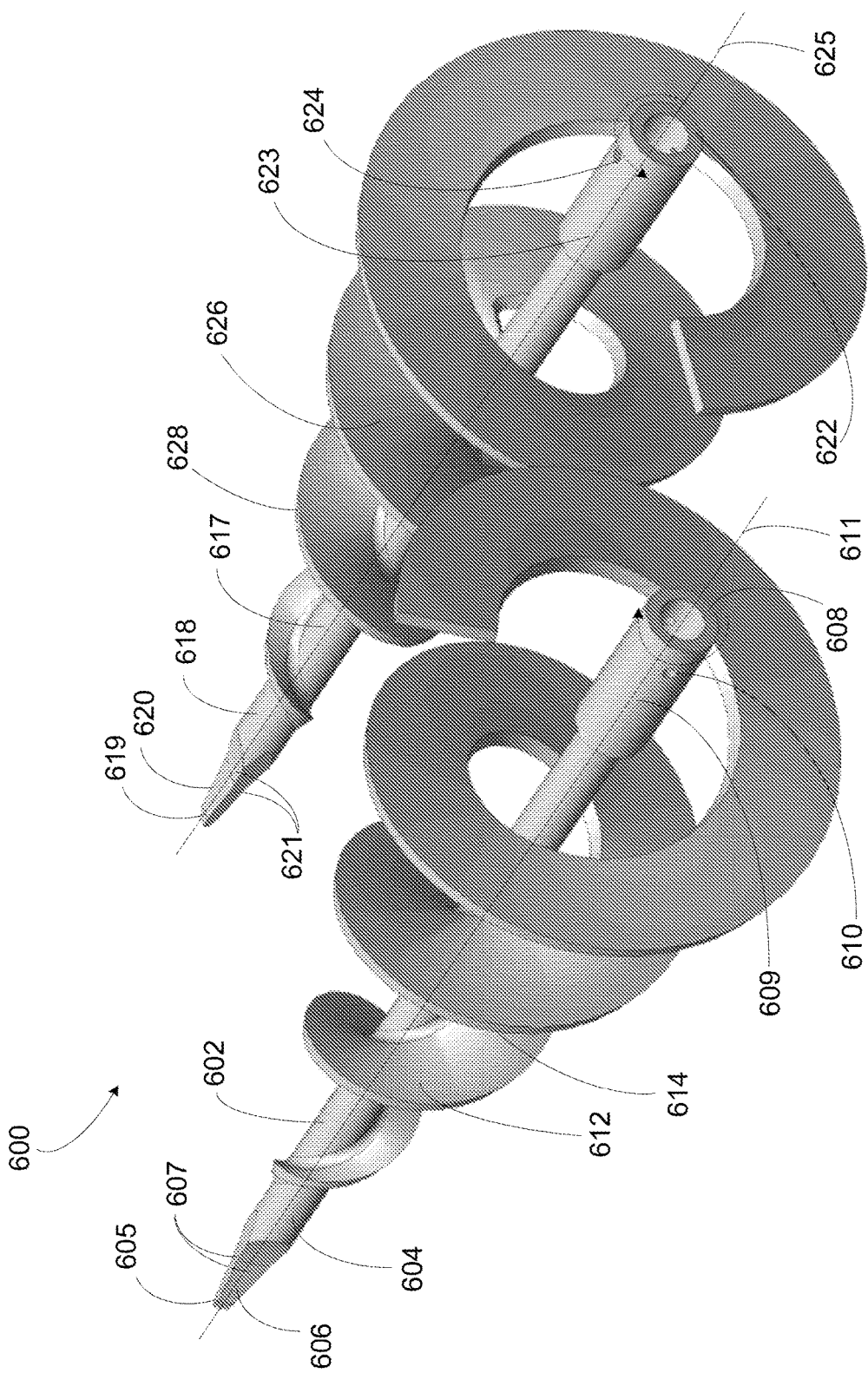
FIG. 5 shows a rear-left axonometric view of the coiled conical blade sub-assembly of the tiller system of FIGS. 1A through 1C.
Figure 6:
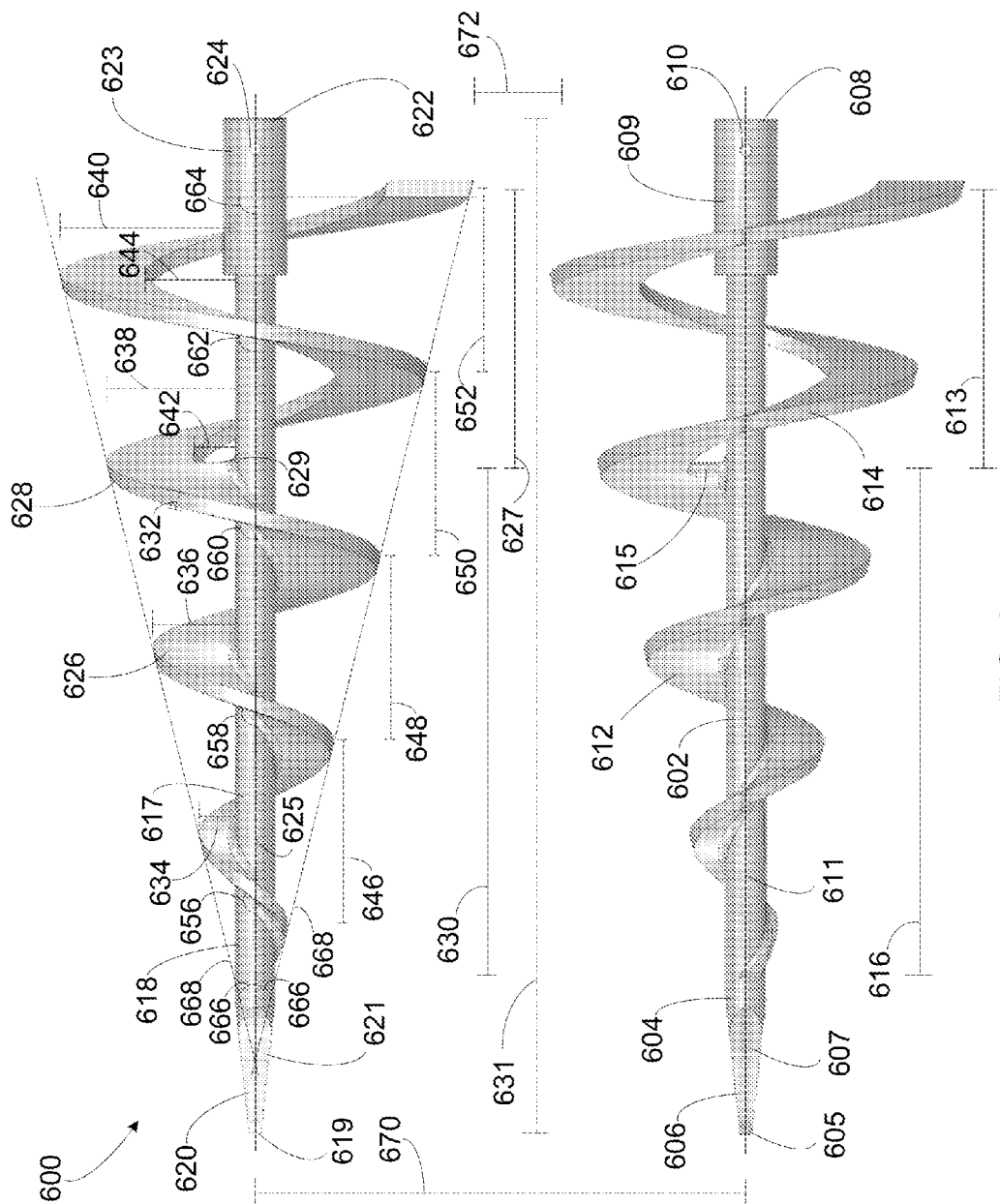
FIG. 6 shows a plan view of the coiled conical blade sub-assembly of FIGS. 1A through 1C.

Turning now to FIGS. 5 and 6, shown are axonometric and plan views, respectively, of the left coiled conical blade 602 and the right coiled conical blade 617 of the coiled conical blade sub-assembly 600. In this exemplary embodiment, the components of the left coiled conical blade 602 and the right coiled conical blade 617 are made of metal. The components may be constructed via casting, welding, and/or combinations of both. In other embodiments, other suitable construction techniques and materials may be utilized.

The left coiled conical blade 602 includes a shaft 604. In this exemplary embodiment, the shaft 604 is substantially cylindrical, has a longitudinal axis 611, and has two opposed ends 605 and 608. A tip 606 is located at one opposed end 605, ahead of the beginning of flighting 612. The tip 606 has a plurality of beveled faces 607 that form a chisel shape. When tilling, the chisel shape of the tip 606 helps anchor the tip 606 in the ground material and break up the ground material in advance of the flighting 612. A collar 609 having a through hole 610 is located at the other opposed end 608. For enhanced strength, the portion of the collar 609 closest to the opposed end 605 can be coupled to the shaft 604 using a fillet (e.g., a fillet weld) (not shown). When coupling the left coiled conical blade 602 to the power sub-assembly 400, the collar 609 fits over the end 426 of the second drive shaft (not shown) of the left shaft assembly housing 412. A pin (not shown) is then inserted through the through hole 610 and the through hole 428 to secure the left coiled conical blade 602 to the second drive shaft. In other embodiments, other connection means can be used, such as a bolt or set screw. Preferably, the connection means permits the left coiled conical blade 602 to be disconnected from the second drive shaft for cleaning, repair and/or replacement.

The flighting 612 is helically coiled about the shaft 604. The flighting 612 is continuous along its length from the opposed end 605 of the shaft 604 toward the opposed end 608 of the shaft 604. As shown, the flighting 612 has an outer edge 614. In this exemplary embodiment, a portion 613 of the flighting 612 is open. The term "open," as used in the specification and claims with respect to a portion of flighting of a coiled conical blade, refers to a physical separation (i.e., the presence of space) between that portion of the length of the flighting and the shaft about which it helically coils. Here, the open portion 613 of the flighting 612 begins at transition point 615 and continues for the remaining length of the flighting 612 toward the opposed end 608. The degree to which the flighting 612 is physically separated from the shaft 604 (i.e., the perpendicular distance from the shaft 604 to the inner edge of the flighting 612) in the open portion 613 varies, as discussed in greater detail later in this specification.

A portion 616 of the flighting 612 is closed. The term "closed," as used in the specification and claims with respect to a portion of flighting of a coiled conical blade, refers to the physical abutment of (i.e., the absence of space between) that portion of the length of the flighting and the shaft about which it helically coils. Here, the closed portion 616 of the flighting 612 extends from transition point 615 along the length of the flighting 612 toward the opposed end 605. In this exemplary embodiment, the closed portion 616 of the flighting 612 is formed by welding the flighting 612 to the surface of the shaft 604. In other embodiments, the flighting 612, shaft 604, and remainder of the left coiled conical blade 602 can be cast from a mold as a unitary construction.

The right coiled conical blade 617 includes a shaft 618 that is substantially cylindrical, has a longitudinal axis 625, and has two opposed ends 619 and 622. A tip 620 is located at one opposed end 619 of the shaft 618, ahead of the beginning of flighting 626. In this exemplary embodiment, the tip 620 includes a plurality of beveled faces 621 that form a chisel shape which helps anchor the tip 620 in the ground material and break up the ground material in advance of the flighting 626. At the other opposed end 622 of the shaft 618 is a collar 623 having a through hole 624. For enhanced strength, the portion of the collar 623 closest the opposed end 619 can be coupled to the shaft 618 using a fillet (e.g., a fillet weld) (not shown). When coupling the right coiled conical blade 617 to the power sub-assembly 400, the collar 623 fits over the end 422 of the second drive shaft of the right shaft assembly housing 414. A pin is then inserted through the through hole 624 and the through hole 424 to secure the right coiled conical blade 617 to the second drive shaft. In other embodiments, other connection means can be utilized, as previously discussed.

The flighting 626 of the right coiled conical blade 617, like the flighting 612 of the left coiled conical blade 602, is continuous along its length from the opposed end 619 toward the opposed end 622, and has an outer edge 628.

Similarly, the flighting 626 has an open portion 627, beginning at the transition point 629 and continuing for the remaining length of the flighting 626 toward the opposed end 622, and a closed portion 630, extending from the transition point 629 along the length of the flighting 626 toward the opposed end 619.

In this exemplary embodiment, the flighting 626 of the right coiled conical blade 617 is helically coiled about the shaft 618 in the opposite direction to that of the flighting 612 of the left coiled conical blade 602. For example, from the axonometric view shown in FIG. 5, the flighting 626 of the right coiled conical blade 617 is helically coiled counterclockwise (i.e., a left-hand helix) about the shaft 618, whereas the flighting 612 of the left coiled conical blade 602 is helically coiled clockwise (i.e., a right-hand helix) about the shaft 604. In operation, the left coiled conical blade 602 and the right coiled conical blade 617 counter-rotate: the left coiled conical blade 602 is rotated clockwise about the longitudinal axis 611 of the shaft 604, and the right coiled conical blade 617 is rotated counterclockwise about the longitudinal axis 625 of the shaft 618, as shown in FIG. 5 with rotational arrows drawn near through holes 610 and 624, respectively.

The inventors have found that utilizing a left coiled conical blade 602 and right coiled conical blade 617 as shown provides enhanced stability, forward propulsion, and tilling characteristics to the tiller system 1000 over conventional tillage devices. For example, the continuity of the flightings 612 and 626 along their lengths provides for consistent contact with a large portion of ground material, which can decrease hopping and increase the traction, forward propulsion, and ground material tillage achieved by the left and right coiled conical blades 602 and 617. In addition, the open portions 613 and 627 of the flightings 612 and 626 allow tilled and displaced ground material to pass through the open portions, which can prevent excessive displacement of the ground material and the digging of unintended trenches in the ground material, and can also reduce vibration by allowing the flightings 612 and 626 to flex and absorb shock. Further, the counter-rotation of the left and right coiled conical blades 602 and 617 with respect to each other can provide enhanced stability on account of mutually counteracting and neutralizing torque and lateral forces applied to the remainder of the tiller system 1000 by each of the left and right coiled conical blades 602 and 617 as they penetrate and till ground material.

In other embodiments, the directions of the helical coiling of the flightings 612 and 626 and/or the arrangement of the left and right coiled conical blades 602 and 617 with respect to each other can be modified to provide desired performance characteristics. For example, the embodiment shown in FIG. 5 minimizes skipping and jumping when tilling harder ground material because contact between only one coiled conical blade with the ground tends to pull the tiller system 1000 back toward the centerline. Alternately, the left coiled conical blade 602 can instead be coupled to the end 422 (i.e., positioned to the right of the right coiled conical blade 617) and rotated clockwise, and the right coiled conical blade 617 can be coupled to end 426 (i.e., positioned to the left of the left coiled conical blade 602) and rotated counterclockwise. This alternate arrangement affects the appearance of the tilled soil and is preferred in certain circumstances if the tilled soil should to be displaced inward toward the centerline of the tiller system 1000 to create mounds.

In this exemplary embodiment, apart from having flightings 612 and 626 that helically coil about their respective shafts 604 and 618 in opposite directions, the right coiled conical blade 617 and the left coiled conical blade 602 have the same dimensions. Accordingly, while the dimensions of the right coiled conical blade 617 are shown in FIG. 6 and will be discussed in detail herein, it is to be understood that these dimensions also apply to the left coiled conical blade 602. Further, the left and right coiled conical blades 602 and 617 can be modified to have different dimensions than those discussed herein in order to alter their performance characteristics and best suit particular ground material conditions.

The right coiled conical blade 617 has an overall length 631, as measured from the opposed end 619 to the opposed end 622. The flighting 626 has a uniform thickness 632 along its entire length.

The radii 634, 636, 638, and 640 of the right coiled conical blade 617 are distances measured at a right angle from the surface of the shaft 618 to the outer edge 628 of the flighting 626 at multiple intervals of full twists of the flighting 626 about the shaft 618. Stated differently, the intervals of full twists of the flighting 626 can be represented as a series of points where the outer edge 614 of the flighting 612 intersects a plane (not shown) that contains the longitudinal axis 611. As shown, these radii increase moving from the opposed end 619 toward the opposed end 622 (e.g., increase from the radius 634 to the radius 640). In this exemplary embodiment, the radii increase substantially linearly, as shown by the planes 668 drawn tangentially to the outer edge 628 of the flighting 626 along its length. That is, the radius of the helical coil of the flighting 626 increases substantially linearly moving toward the opposed end 622.

The closed portion 630 of the flighting 626 extends along the length of the flighting 626 from the transition point 629 toward the opposed end 619. In the closed portion 630 of the flighting 626, the radius of the right coiled conical blade 617, as measured from the surface of the shaft 618 to the outer edge 628 of the flighting 626 (e.g., the radii 634 and 636), is equal to the width of the flighting 626.

The open portion 627 of the flighting 626 extends along the length of the flighting 626 from the transition point 629 toward the opposed end 622. In the open portion 627 of the flighting 626, the radius of the right coiled conical blade 617, as measured from the surface of the shaft 618 to the outer edge 628 of the flighting 626 (e.g., the radii 638 and 640), is equal to the width of the flighting 626 plus the perpendicular distance (e.g., distances 642 and 644) between the surface of the shaft 618 to the inner edge of the flighting 626.

The lengths 646, 648, 650, and 652 of the shaft 618 are measured between points on the flighting 626 at intervals of full twists of the flighting 626 about the shaft 618, as previously discussed. In this exemplary embodiment, the lengths 646, 648, 650, and 652 are equal because the rate of twist of the flighting 626 about the shaft 618 is constant, the rate of twist being defined as the number of full twists of the flighting 626 (e.g., 1 full twist) over a finite length of the shaft 618 (e.g., the length 646).

The extent to which the flighting 626 of the right coiled conical blade 617 is open can be expressed, for example, as a ratio of the open portion 627 relative to the overall length 631 of the right coiled conical blade 617, as a ratio of the open portion 627 relative to the closed portion 630, or as the number of full twists of the flighting 626 about the shaft 618 in the open portion 627 (i.e., open twists). Preferably, the open portion 627 includes at least 1 full twist of the flighting 626 about the shaft 618.

The helix angles 656, 658, 660, 662, and 664 are measured between the outer edge 628 of the flighting 626 and the longitudinal axis 625 of the shaft 618, as shown. In this exemplary embodiment, the helix angles 656, 658, 660, and 662 are obtuse and decrease moving from the opposed end 619 toward the opposed end 622 (e.g., the decrease from the helix angle 656 to the helix angle 662), approaching the helix angle 664 of approximately ninety degrees at the end of the flighting 626 nearest the opposed end 622.

In this exemplary embodiment, the linearly increasing radius of the helical coil of the flighting 626, as previously discussed, defines in three-dimensions the conical shape of the right coiled conical blade 617 (see also FIG. 5), which is represented in two-dimensions by planes 668 and vertex angles (i.e., half angles) 666. As shown, the vertex of the conical shape is set inward from the opposed end 619 and the base of the conical shape is set inward from the opposed end 622.

Lastly, in this exemplary embodiment, when the coiled conical blade sub-assembly 600 is assembled with the remainder of the tiller system 1000, the longitudinal axes 611 and 625 of the shafts 604 and 618 are co-planar and spaced apart by a distance 670, such that a distance 672 is maintained between the ends of the flightings 626 and 612 of the right and left coiled conical blades 617 and 602 nearest the opposed ends 622 and 608, respectively.

Figure 7:
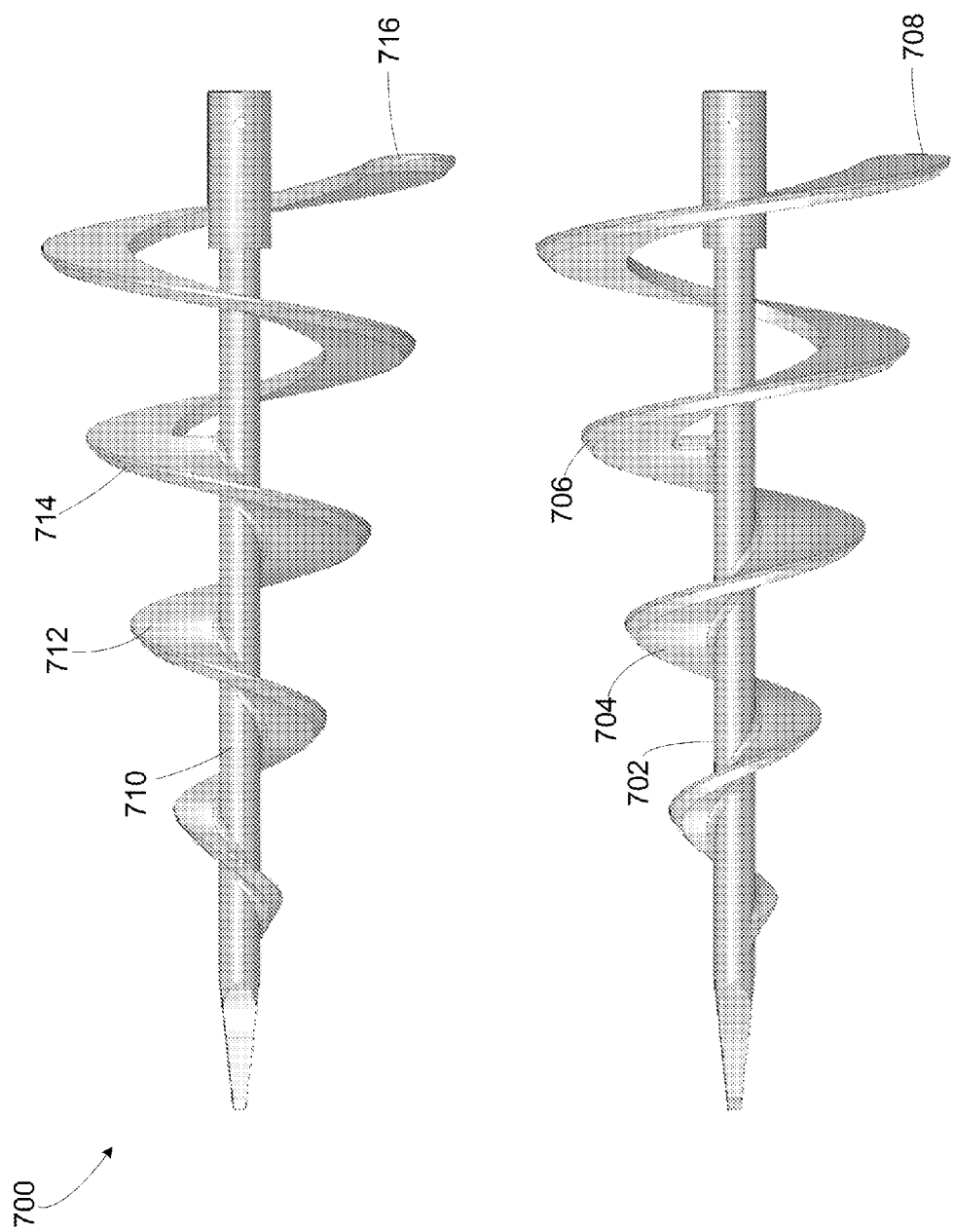
FIG. 7 shows a plan view of a coiled conical blade sub-assembly in accordance with another exemplary embodiment of the present invention.

Turning now to FIG. 7, shown is a plan view of a coiled conical blade sub-assembly 700 in accordance with another exemplary embodiment of the present invention. The coiled conical blade sub-assembly 700 comprises a left coiled conical blade 702 and a right coiled conical blade 710, which are similar to the left and right coiled conical blades 602 and 617 of the coiled conical blade sub-assembly 600. Here, however, the flighting 704 of the left coiled conical blade 702 and the flighting 712 of the right coiled conical blade 710 have beveled outer edges 706 and 714, as well as beveled ends 708 and 716, respectively. The beveled outer edges 706 and 714 and the beveled ends 708 and 716 of this exemplary embodiment are intended to decrease the surface area of the outer edges of the flightings 704 and 712 that contact the ground material when tilling, which increases the bite of the flightings 704 and 712 into the ground material to provide enhanced traction and tillage and prevent the left and right coiled conical blades 702 and 710 from skipping and hopping on the surface of the ground material.

Figure 8:
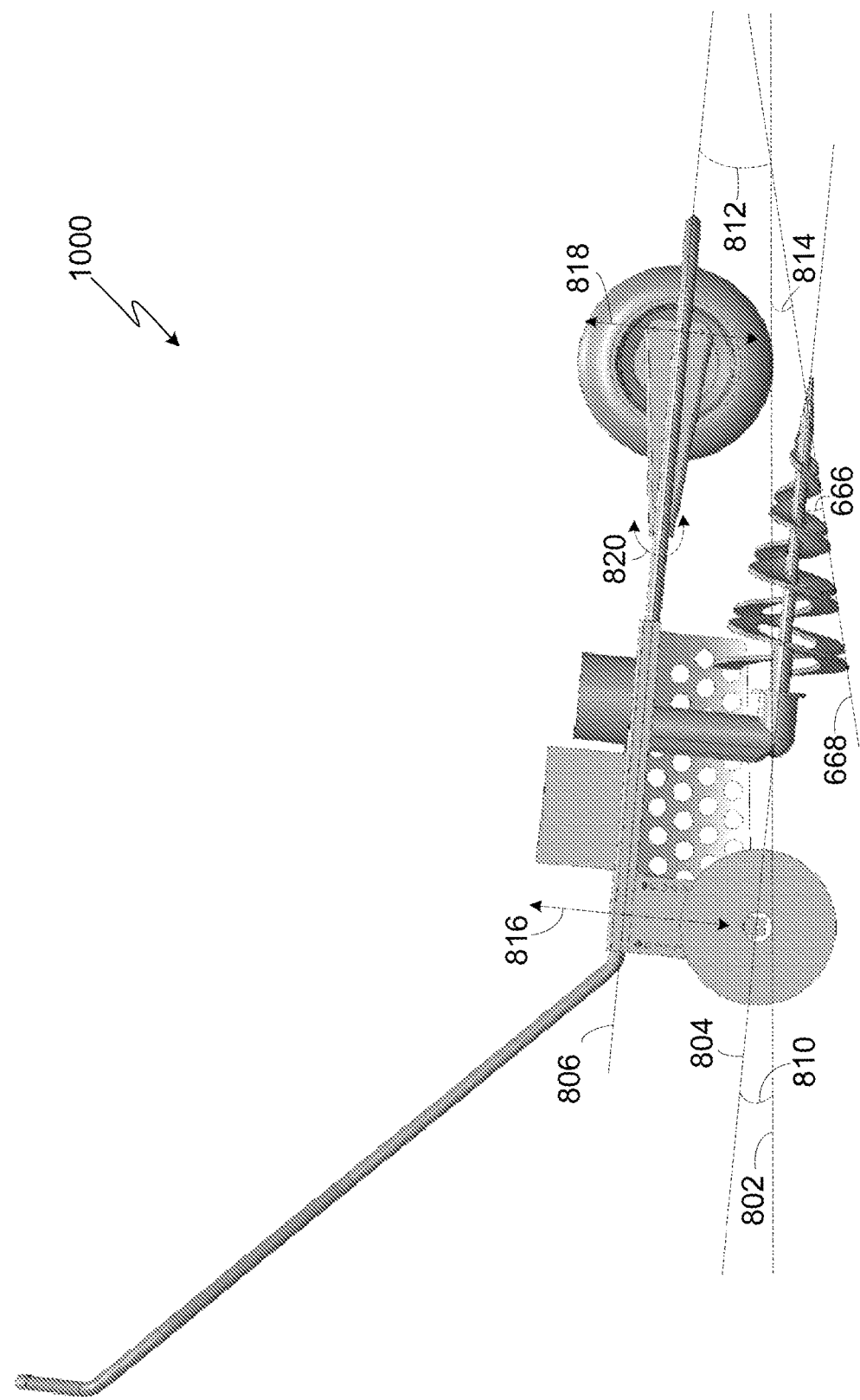
FIG. 8 shows a right side view of the tiller system of FIGS. 1A through 1C.

Turning now to FIG. 8, shown is a right side view of the tiller system 1000 positioned on a ground plane 802. The ground plane 802 represents an approximation of the location of the surface of the ground material to be tilled with the tiller system 1000. While the ground plane 802 is shown as being flat and tangential to the edges of the center openings 316 and 332 of the left and right rear wheels 314 and 330 and the front wheel 528, it should be understood that FIG. 8 is illustrative and is not necessarily representative of actual conditions that may be encountered when practicing embodiments of the present invention. For example, the ground material to be tilled may not be flat, and the left and right rear wheels 314 and 330 may penetrate and/or compress the ground material to varying degrees.

In this exemplary embodiment, a plane 804 is co-planar to the longitudinal axes 611 and 625 (see also FIGS. 5 and 6) of the shafts 604 and 618 of the left and right coiled conical blades 602 and 617, respectively. A plane 806 is parallel to the plane 804 and co-planar to the longitudinal axis 105 of the tiller frame 101 (see also FIGS. 2 and 3) and the longitudinal axis 503 of the front wheel frame 502 (see also FIGS. 4A and 4B). Accordingly, in this embodiment, the angle 810 defined between the plane 804 and the ground plane 802 is equal to the angle 812 defined between the plane 806 and the ground plane 802. Also, the longitudinal axes 611 and 625 of the left and right coiled conical blades 602 and 617 are parallel to the longitudinal axis 105 of the tiller frame 101.

The angle 810 represents an angle of penetration of the left and right coiled conical blades 602 and 617 into the ground plane 802 (i.e., into the ground material to be tilled). The angle 814 also represents an angle of penetration of the left and right coiled conical blades 602 and 617, but rather than being defined with respect to the longitudinal axes of the shafts 604 and 618 relative to the ground plane 802, the angle 814 is defined with respect to the conical shape of the left and right coiled conical blades 602 and 617 (as represented by the plane 668 and vertex angle 666) relative to the ground plane 802.

In this exemplary embodiment, the rear wheel sub-assembly 300 can be raised and lowered relative to the remainder of the tiller system 1000. As previously discussed, adjusting the height of the rear wheel sub-assembly 300 is accomplished by withdrawing the adjustment pins 308 and 324 from the respective adjustment holes of the plurality of adjustment holes 114 and 120, sliding left and right guide rails 310 and 326 within the respective guide rail slots 116 and 122, and reinserting the adjustment pins 308 and 324 into different adjustment holes of the plurality of adjustment holes 114 and 120. Adjusting the height of the rear wheel sub-assembly 300 in this manner raises or lowers the rearward end of the tiller frame 101 relative to the ground plane 802, as indicated by the double-headed arrow 816, and also increases or decreases the angle 810 at which the left and right coiled conical blades 602 and 617 penetrate the ground plane 802.

An operator of the tiller system 1000 can therefore adjust the angle 810 of penetration of the left and right coiled conical blades 602 and 617 based on the conditions of the ground material to be tilled. The inventors have found that harder ground material typically requires a greater angle 810 of penetration, whereas softer ground material typically requires a lesser angle 810 of penetration. For example, a suitable angle 810 of penetration for hard ground material may be between 10 to 25 degrees, and a suitable angle 810 of penetration for soft ground material may be between 1 to 10 degrees. However, various ground material conditions may warrant a wider variety of angles 810 of penetration.

In this exemplary embodiment, the front wheel 528 can also be raised and lowered relative to the tiller frame 101 and the front wheel frame 502, as indicated by the double-headed arrow 818. As previously discussed, adjusting the height of the front wheel 528 is accomplished by inserting an adjustment pin through adjustment through holes 506 and 512 and into one of the plurality of adjustment through holes 520 and one of the plurality of adjustment through holes 526. Adjusting the height of the front wheel 528 in this manner pivots the right swing arm 516 and the left swing arm 522 about the right and left swing arm mount brackets 508 and 514, respectively, as indicated by the double-headed arrow 820. The pivoting motion raises or lowers the forward end of the tiller frame 101 and the front wheel frame 502 relative to the ground plane 802, which in turn increases or decreases the angle 810 at which the left and right coiled conical blades 602 and 617 penetrate the ground plane 802.

Accordingly, by adjusting one or both of the heights of the rear wheel sub-assembly 300 and the front wheel 528, the angle 810 at which the left and right coiled conical blades 602 and 617 penetrate the ground plane 802 can be controlled by an operator of the tiller system 1000 to best suit the conditions of the ground material and improve the speed, stability, and efficiency with which the ground material is tilled.

While the principles of the invention have been described above in connection with preferred embodiments, it is to be clearly understood that this description is made only by way of example and not as a limitation of the scope of the invention.

The invention claimed is:

1. A system for tilling ground material comprising:
   a frame having a forward end and a rearward end;
   a rear wheel sub-assembly coupled to the frame, the rear wheel sub-assembly comprising at least one rear wheel, at least a portion of the at least one rear wheel being positionable below the frame;
   a front wheel sub-assembly coupled to the frame, the front wheel sub-assembly comprising at least one front wheel, the at least one front wheel being positioned forward with respect to the at least one rear wheel;
   a first coiled conical blade, the first coiled conical blade having a shaft having a longitudinal axis, at least a portion of the first coiled conical blade being positioned below the lowermost portion of the frame, at least a portion of the first coiled conical blade being positioned forward of the at least one rear wheel and rearward of the at least one front wheel;
   a second coiled conical blade, the second coiled conical blade having a shaft having a longitudinal axis, at least a portion of the second coiled conical blade being positioned below the lowermost portion of the frame, at least a portion of the second coiled conical blade being positioned forward of the at least one rear wheel and rearward of the at least one front wheel;
   a power sub-assembly coupled to the frame and the first and second coiled conical blades, the power sub-assembly comprising at least one motor operatively configured to rotate the first and second coiled conical blades about their respective longitudinal axes of their respective shafts; and
   a handle bar sub-assembly coupled to the frame, the handle bar sub-assembly comprising at least one member extending rearward of the at least one rear wheel,
   wherein the first and second coiled conical blades each comprise:
      the shaft having a first and second opposed end, the first opposed end having a tip; and
      flighting helically coiled about the shaft, the helical coil of the flighting of each of the first and second coiled conical blades having a radius that increases from the first opposed end toward the second opposed end, respectively, wherein the flighting helically coiled about the shaft is continuous along its length from the first opposed end toward the second opposed end, a portion of the flighting extending from the first opposed end to a transition point on the shaft is closed, and a portion of the flighting extending from the transition point on the shaft to the second opposed end is open and free from attachment to the shaft.

2. The system of claim 1, wherein the closed portion of the flighting is positioned toward the first opposed end and the open portion of the flighting is positioned toward the second opposed end.

3. The system of claim 1, wherein the helical coil of the flighting has a radius that increases linearly from the first opposed end toward the second opposed end, defining a conical shape.

4. The system of claim 1, wherein the longitudinal axes of the shafts of the first and second coiled conical blades are co-planar.

5. The system of claim 1, wherein the longitudinal axes of the shafts of the first and second coiled conical blades are parallel with a longitudinal axis of the frame.

6. The system of claim 1, wherein a distance of the at least one rear wheel relative to the frame is adjustable.

7. The system of claim 1, wherein a distance of the at least one front wheel relative to the frame is adjustable.

8. The system of claim 1, wherein the at least one rear wheel comprises at least two coulter wheels.

9. The system of claim 1, wherein the power sub-assembly comprises:
   a first electric motor operatively coupled to a power source and at least one first drive shaft, the at least one first drive shaft being operatively coupled to the first coiled conical blade; and
   a second electric motor operatively coupled to the power source and at least one second drive shaft, the at least one second drive shaft being operatively coupled to the second coiled conical blade.

10. A system for tilling ground material comprising:
    a frame having a forward end and a rearward end;
    a rear wheel sub-assembly coupled to the frame, the rear wheel sub-assembly comprising at least one rear wheel, at least a portion of the at least one rear wheel being positionable below the frame;
    a front wheel sub-assembly coupled to the frame, the front wheel sub-assembly comprising at least one front wheel, the at least one front wheel being positioned forward with respect to the at least one rear wheel;
    a first coiled conical blade, the first coiled conical blade having a shaft having a longitudinal axis, first and second opposed ends, and flighting helically coiled about the shaft, the flighting of the first coiled conical blade including a front portion of the flighting extending from the first opposed end to a transition point of the shaft and a rear portion extending from the transition point of the shaft to the second opposed end, the front portion of the flighting abutting the shaft of the first coiled conical blade and the rear portion of the flighting being separated from the shaft of the first coiled conical blade such that the rear portion of the flighting proximate to the second opposed end is free from attachment to the shaft of the first coiled conical blade, at least a portion of the first coiled conical blade being positioned below the lowermost portion of the frame, at least a portion of the first coiled conical blade being positioned forward of the at least one rear wheel and rearward of the at least one front wheel;
    a second coiled conical blade, the second coiled conical blade having a shaft having a longitudinal axis, first and second opposed ends, and flighting helically coiled about the shaft, the flighting of the second coiled conical blade including a front portion of the flighting extending from the first opposed end to a transition point of the shaft and a rear portion extending from the transition point of the shaft to the second opposed end, the front portion of the flighting abutting the shaft of the second coiled conical blade and the rear portion of the flighting being separated from the shaft of the second coiled conical blade such that the rear portion of the flighting proximate to the second opposed end is free from attachment to the shaft of the second coiled conical blade, at least a portion of the second coiled conical blade being positioned below the lowermost portion of the frame, at least a portion of the second coiled conical blade being positioned forward of the at least one rear wheel and rearward of the at least one front wheel, wherein the flighting of the second coiled conical blade is helically coiled in an opposite direction than a direction in which the flighting of the first coiled conical blade is helically coiled;

a power sub-assembly coupled to the frame and the first and second coiled conical blades, the power sub-assembly comprising at least one motor operatively configured to rotate the first and second coiled conical blades about their respective longitudinal axes of their respective shafts; and a handle bar sub-assembly coupled to the frame, the handle bar sub-assembly comprising at least one member extending rearward of the at least one rear wheel.

11. The system of claim 10, wherein the helical coil of the flighting of the first coiled conical blade has a radius that increases from one end of the shaft of the first coiled conical blade to another end of the shaft of the first coiled conical blade, and the helical coil of the flighting of the second coiled conical blade has a radius that increases from one end of the shaft of the second coiled conical blade to another end of the shaft of the second coiled conical blade.

12. The system of claim 10, wherein the flighting of the first coiled conical blade and the flighting of the second coiled conical blade are continuous along their respective lengths.

13. A system for tilling ground material comprising:

a frame having a forward end and a rearward end;

a rear wheel sub-assembly coupled to the frame, the rear wheel sub-assembly comprising at least one coulter wheel, at least a portion of the at least one rear coulter wheel being positionable below the frame;

a front wheel sub-assembly coupled to the frame, the front wheel sub-assembly comprising at least one front wheel, the at least one front wheel being positioned forward with respect to the at least one coulter wheel;

a first coiled conical blade, the first coiled conical blade having a shaft having a longitudinal axis, first and second opposed ends, and flighting helically coiled about the shaft, the flighting of the first coiled conical blade including a front portion of the flighting extending from the first opposed end to a transition point of the shaft and a rear portion extending from the transition point of the shaft to the second opposed end, the rear portion of the flighting being open and free from attachment to the shaft of the first coiled conical blade, at least a portion of the first coiled conical blade being positioned below the lowermost portion of the frame, at least a portion of the first coiled conical blade being positioned forward of the at least one coulter wheel and rearward of the at least one front wheel;

a second coiled conical blade, the second coiled conical blade having a shaft having a longitudinal axis, first and second opposed ends, and flighting helically coiled about the shaft, at least a portion of the second coiled conical blade being positioned below the lowermost portion of the frame, the flighting of the first coiled conical blade including a front portion extending from the first opposed end to a middle point of the shaft and a rear portion extending from the middle point of the shaft to the second opposed end, the rear portion of the flighting being open and free from attachment to the shaft of the first coiled conical blade, at least a portion of the second coiled conical blade being positioned forward of the at least one coulter wheel and rearward of the at least one front wheel, wherein the flighting of the second coiled conical blade is helically coiled in an opposite direction than a direction in which the flighting of the first coiled conical blade is helically coiled;

a power sub-assembly coupled to the frame and the first and second coiled conical blades, the power sub-assembly comprising at least one motor operatively configured to counter-rotate the first and second coiled conical blades about their respective longitudinal axes of their respective shafts; and a handle bar sub-assembly coupled to the frame, the handle bar sub-assembly comprising at least one member extending rearward of the at least one rear wheel.

14. The system of claim 13, wherein a distance of the at least one coulter wheel relative to the frame is adjustable.

15. The system of claim 13, wherein a distance of the at least one front wheel relative to the frame is adjustable.

16. The system of claim 13, wherein the longitudinal axis of the shaft of the first coiled conical blade is co-planar and parallel with the longitudinal axis of the shaft of the second coil conical blade.

* * * * *